US010977235B2

(12) United States Patent
Paraschivescu

(10) Patent No.: US 10,977,235 B2
(45) Date of Patent: Apr. 13, 2021

(54) MANAGING CHANGES TO INFORMATION

(71) Applicant: Quick Eye Technologies Inc., Chicago, IL (US)

(72) Inventor: Andrei Paraschivescu, Chicago, IL (US)

(73) Assignee: QUICK EYE TECHNOLOGIES INC., Chicago, IL (US)

(*) Notice: Subject to any disclaimer, the term of this patent is extended or adjusted under 35 U.S.C. 154(b) by 188 days.

(21) Appl. No.: 16/173,885

(22) Filed: Oct. 29, 2018

(65) Prior Publication Data
US 2019/0340163 A1 Nov. 7, 2019

Related U.S. Application Data

(63) Continuation of application No. 14/769,023, filed as application No. PCT/US2014/017500 on Feb. 20, 2014, now Pat. No. 10,114,849.

(60) Provisional application No. 61/767,202, filed on Feb. 20, 2013, provisional application No. 61/767,215, filed on Feb. 20, 2013.

(51) Int. Cl.
G06F 16/00 (2019.01)
G06F 16/23 (2019.01)
G06F 16/21 (2019.01)
G06F 16/2458 (2019.01)
G06F 8/71 (2018.01)

(52) U.S. Cl.
CPC ............ *G06F 16/2329* (2019.01); *G06F 8/71* (2013.01); *G06F 16/219* (2019.01); *G06F 16/2477* (2019.01)

(58) Field of Classification Search
CPC ...... G06F 16/1873; G06F 16/219; G06F 8/71; G06F 16/2329
USPC ........................................................ 707/695
See application file for complete search history.

(56) References Cited

U.S. PATENT DOCUMENTS

| 7,774,191 B2* | 8/2010 | Berkowitz | G06F 16/22 703/23 |
| 8,712,944 B1* | 4/2014 | Kim | G06Q 50/01 706/45 |
| 2002/0173936 A1* | 11/2002 | Srinivasan | G05B 23/021 702/188 |
| 2003/0093435 A1 | 5/2003 | Bandekar | |
| 2005/0144198 A1* | 6/2005 | Bergstraesser | G06F 16/289 707/707 |

(Continued)

OTHER PUBLICATIONS

Young, Lee W., Authorized Officer, ISA/US, International Search Report and Written Opinion, International Application No. PCT/US2014/017500, dated Jul. 14, 2014, 7 pages.

*Primary Examiner* — Alexandria Y Bromell
(74) *Attorney, Agent, or Firm* — Perkins Coie LLP

(57) ABSTRACT

Changes to information are managed by storing information as a plurality of objects. Each object has one or more states. One or more temporal histories are maintained for each object based on the plurality of states of the object at a plurality of time instances. For each state of the object, whether or not the state is a user of another state of the object or another object is determined. When a request to change the information is received, at least one state of at least one of the plurality of objects is selectively changed. When it is determined that the at least one state is the user of another state, then the changing is further responsive to changes in the another state.

18 Claims, 7 Drawing Sheets

(56) References Cited

U.S. PATENT DOCUMENTS

| | | | |
|---|---|---|---|
| 2005/0216248 A1* | 9/2005 | Ciolfi | G06F 30/20 |
| | | | 703/22 |
| 2006/0031235 A1* | 2/2006 | Foresti | G06F 16/907 |
| | | | 707/707 |
| 2006/0149582 A1* | 7/2006 | Hawkins | G06Q 99/00 |
| | | | 717/140 |
| 2007/0018953 A1* | 1/2007 | Kipersztok | G06F 16/3323 |
| | | | 345/156 |
| 2008/0059773 A1* | 3/2008 | Fant | G06F 9/4484 |
| | | | 712/220 |
| 2008/0208372 A1* | 8/2008 | Pannese | G05B 13/027 |
| | | | 700/48 |
| 2008/0288089 A1* | 11/2008 | Pettus | G05B 19/4184 |
| | | | 700/9 |
| 2009/0234899 A1* | 9/2009 | Kramer | G06F 16/2465 |
| | | | 708/200 |
| 2010/0280809 A1* | 11/2010 | Takahashi | G16H 50/20 |
| | | | 703/11 |
| 2011/0320228 A1* | 12/2011 | Kowalski | G06Q 10/06393 |
| | | | 705/7.11 |
| 2012/0005534 A1* | 1/2012 | Li | G06F 11/0709 |
| | | | 714/26 |
| 2012/0023078 A1* | 1/2012 | Malatesta | G06F 16/2358 |
| | | | 707/703 |
| 2013/0325787 A1* | 12/2013 | Gerken | G06N 5/048 |
| | | | 706/52 |
| 2014/0359584 A1* | 12/2014 | Chu | G06F 8/70 |
| | | | 717/131 |
| 2015/0379061 A1 | 12/2015 | Paraschivescu | |
| 2016/0148103 A1* | 5/2016 | Sarrafzadeh | G06K 9/469 |
| | | | 706/46 |

\* cited by examiner

FIG. 2B

MANAGING CHANGES TO INFORMATION

CROSS REFERENCE TO RELATED APPLICATIONS

This patent document is a continuation of U.S. patent application Ser. No. 14/769,023 entitled "MANAGING CHANGES TO INFORMATION", filed on Aug. 19, 2015, which is a 35 U.S.C. § 371 National Stage application of PCT Application No. PCT/US2014/017500 entitled "MANAGING CHANGES TO INFORMATION," filed on Feb. 20, 2014, which further claims the benefits and priorities of U.S. Provisional Patent Application No. 61/767,202 entitled "MANAGING CHANGES TO INFORMATION" and U.S. Provisional Patent Application No. 61/767,215 entitled "MANAGING A TEMPORAL HIERARCHICAL DATA," both filed on Feb. 20, 2013. The entire content of the aforementioned patent applications are incorporated by reference as part of the disclosure of this application.

BACKGROUND

This application relates to data management.

The amount of data that can be processed and stored by one or more computers has grown multi-fold over the last few years. The explosive growth in the data managed and processed by computers can be witnessed in application areas such as web servers, e-commerce servers, financial databases, multimedia content servers, and so on.

SUMMARY

The present document describes techniques for managing data items, or groups of data items, such that data items can be modified while maintaining data hierarchy and interdependency.

In one aspect, techniques are provided for managing changes to information by storing information as a plurality of objects, each object having a plurality of states, maintaining one or more temporal histories for each object based on the plurality of states of the object at a plurality of time instances, determining, for each state of the object, whether the state is a user of another state of the object or another object, receiving a request to change the information, and selectively changing, responsive to the request, at least one state of at least one of the plurality of objects. When it is determined that the at least one state is the user of another state, then the changing is further responsive to changes in the another state.

The details of above aspects and their implementations are set forth in the accompanying drawings, the description and the claims.

BRIEF DESCRIPTION OF THE DRAWINGS

FIG. 2B illustrates an example of a step by step batch representation.

DETAILED DESCRIPTION

Information often, but not always, changes over a period of time. For example, 1950 baseball champion team may not change, but the record for most hits in a baseball game will change over a period of time. Similarly, in software code development scenario, some files, e.g., source code or header files, may not change over the life time of the software, but some other files may change over a period of time to add new features or to perform bug fixes and so on.

Data used in many application may have interdependencies. For example, in one hypothetical example, System A may maintain and use earth-moon information (e.g., rise/set times, location, tides, etc.) while another System B may maintain earth-moon-satellite information. In this scenario, the changes to the Earth and moon data in System A may have an impact on System B, while changes to satellite data in System B may have no impact on System A. Therefore, certain information from System A may be a "resource" for certain information in System B, while that information in System B may be called to have a "user" relationship to some information in System A.

In applications where complex interdependencies exist among data items with data items being modified, there to not presently exist any solutions to effectively track and manage these interdependencies and changes to information. Tools that provide version tracking (e.g., source code revision control system, or RCS), techniques for tracking changes to Word documents, etc. provide "special purpose" suffer from numerous limitations and are not ubiquitously applicable. For example. Word files can track changes from a previous version, but do not track changes to changes. Similarly, Word files do not track changes from interdependencies, e.g., one Word file changing due to changes in another Word file. Similarly, while RCS can tie together changes to one source file with changes to another source file through the use of a Makefile, RCS does not make a downstream file (a "user") aware of changes to a "resource" file.

Figure 3:
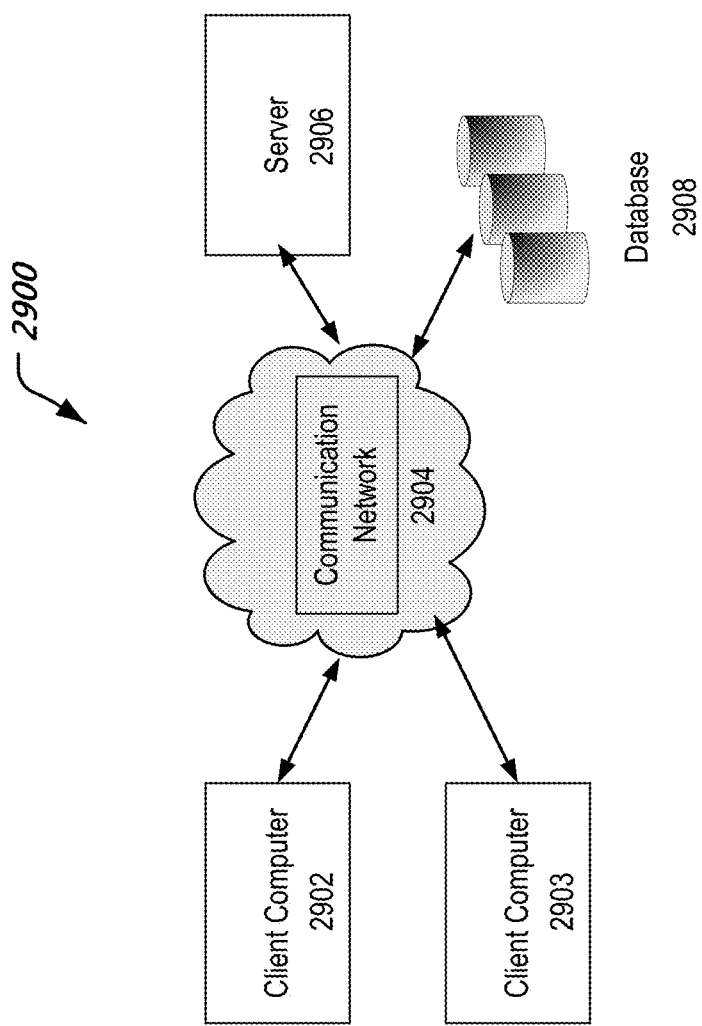
FIG. 3 is a block diagram representation of an example of an information processing system.

FIG. 3 depicts an example system 2900 comprising client computers 2902, 2903 communicatively coupled over a communication network 2904 with a server 2906 and a database 2908. The various techniques described in this document can be implemented at the client computer 2902, the server 2906 or partly between the client computer 2902 and the server 2906.

The communication network 2904 can be a suitable network, such as a wired or wireless network, e.g., the Internet, Ethernet, wireless cellular network such as 3G, Long Term Evolution (LTE) network, WiMax, etc. In various embodiments, the client computer 2902 may be a computer, a smartphone, a tablet device, using a suitable operating system. The server 2906 may include a processor, instruction memory and a suitable operating system. The database 2908 may be implemented using storage such as hard drive, flash memory, etc. In various embodiments, the server 2906 and the database 2908 may be implemented on the same hardware platform (e.g., sharing the same power source) or may comprises two different platforms connected over a local connection such as an SCSI interface.

Headings are used in this document only for clarity of explanation and do not in any way limit the scope of the disclosed technology.

1. Introduction

Some building blocks of QEI and the real world problem it addresses are briefly discussed in Section 1. Section 2 goes systematically over the concepts underlying QEI's functionality and design; it ends with 2.6 which is a roadmap for the rest of the paper: metadata representation (Section 3), provided operations (Section 4), and finally the requirements QEI imposes on data (Section 5).

1.1 A Platform for Open Data

A current trend is the increased pace of change in the structure of data. Different from the speed of accumulation of data of a certain kind, this results in a need to adapt database representations and code more frequently.

Dynamic data structures are difficult to handle. When the structure is static, one can build a specialized system, which can be robust and efficient, with a good user interface. However the very same qualities make it difficult to upgrade, presenting a tradeoff between the advantages of specialization and the length of release cycles. This creates a problem for dynamic businesses like finance, where the upgrade cycle cannot be shortened enough. It is common to see stop-gap solutions, especially spreadsheets. However, in the long run scalability and reliability are desired, and new systems are built. Development and transition costs are high.

One approach to dynamism is modularity, which consists of breaking down information into stand-alone pieces, perhaps with dependencies. This allows individual pieces, i.e. modules, to evolve at their own pace, and distribute the problem among firms and teams. Modularity is ubiquitous in software development, mechanical design, even mathematics; beyond a certain complexity, any problem requires building blocks.

Standardization helps modularity tremendously, as it draws the boundaries between pieces, and creates competition to produce them. Dynamism is opposite: because problems are less set, standards are not established yet. Trying things out is necessary, sometimes requiring substantial integration efforts.

Being able to keep track of versions becomes a desirable feature. This observation predates computers: whiteprints and then cheaper blueprints started to be used at the turn of the $20^{th}$ century for designs, and currently version control systems are widely used, from software development, industrial design to documents. There are numerous benefits: freedom to try knowing reverting is easy, combining work done by multiple individuals, locate problems, observe the evolution of an idea etc. Without version control, the world of design today would be inconceivable.

One reason an equivalent of open source software development for the realm of data does not exists may be because currently there is no system capable of solving the complexities of systematically maintaining versions of data. The problem is more complex than software version control (SVC), for a number of reasons:

1. The relationships among data modules is to be kept track of, because combining data from different sources can result in inconsistencies. This is not done in SVC, which treats sets of files as amorphous, ignoring semantic relationships. While relationships can be stored as files, this allows checking for consistency but does not provide an approach to reconciling conflicts among two groups of data items (Makefiles are tracked, but to the SVC system they are just another file. AutoDesk Vault records the revision of component designs within the revision of the aggregate design.)
2. For data to be functional it often needs corresponding code, which in turn may specify a platform (operating system, libraries, other software). These dependencies should also be tracked.
3. Data changes over time. Consider maintaining information about a stock. Dividends should be recorded, and every time a one is announced, the prior information becomes incomplete. It is not that it has become incorrect, but simply time has passed. This can occur with code, but very rarely. Y2K is an example.

QEI is an innovative solution to the problem of, among others, managing versions of what can be called hierarchical data, modules of data characterized by user/resource relationships. A user module needs resource modules to function, while the latter function independently of their users, of which there can be many or none.

QEI enables building a platform for modular data, with the following *desiderata:*

(A) Store data along with code and execution platform requirements.
(B) Allows combining groups of data, providing conflict detection and resolution.
(C) Read-only data is available in a standard format (e.g. SQL schema) for any application that needs, without the application begin cognizant of the platform.
(D) A module of data produced in one programming language (Python, C++, Java) is available in others.
(E) Normal evolution of data (e.g. accumulating dividend information as above) can be automated.
(F) Makes converting data to a new version of code a systematic process; translation code should be provided.
(G) Provides a reasonable development framework for producers of data.
(H) It is scalable and secure.

1.2 The QE Platform (QEP)

QEP distinguishes between producers and consumers of data. A related concept is that of mutable and immutable data; all data is initially mutable, but at some point it is frozen and becomes immutable. Immutable data cannot be edited directly, but a mutable copy can be made (A similar process is used in file version control. A file committed into a repository is immutable, while a working copy is mutable). Consumers of data only have access to immutable data.

QEP is a distributed platform composed of QE Zones, physically similar but residing on different servers, potentially at different firms. Zones can obtain immutable data from each other, either individual items or as time series (similar to a subscription). Mutable data cannot be seen in another zone, and thus whoever needs to interact with mutable data should have access to that particular zone.

Figure 1A:
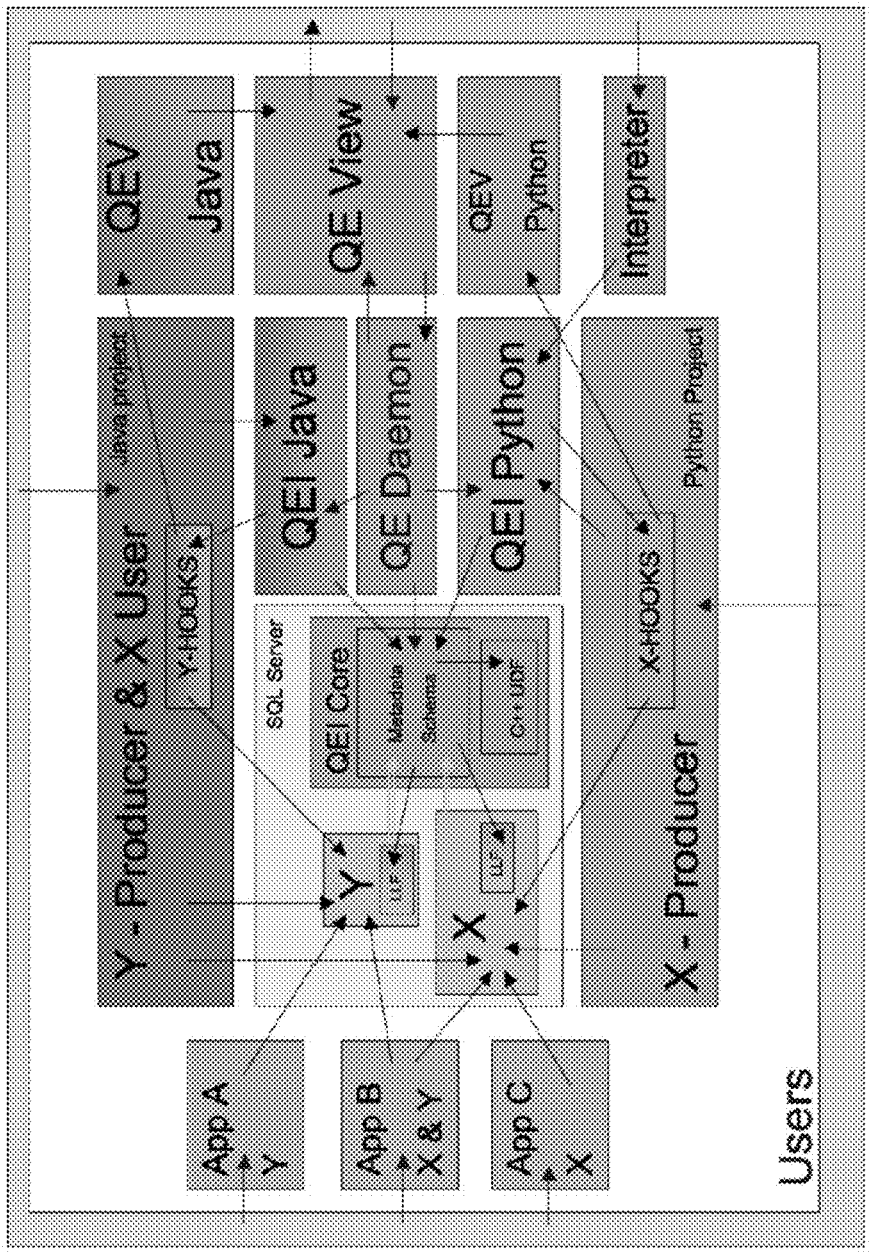
FIG. 1A is a block diagram of an example data processing system.

FIG. 1A shows the architecture of a zone. The data resides on a SQL server. Zone "Example" has two projects X and Y which it produces, each with data stored on the SQL Server, consisting of one or more schema. Applications A, B and C access immutable data in these schemas, and do not need to be concerned with how they were produced, or that they are part of a QE Zone.

Project X produces data in Python, and resides on a machine with access to the SQL Server. The machine should also have QEI Python installed, the interface between QEI application code and QEI Core. QEI Core can be given commands through QE Python, or directly via stored procedures. The same goes for Y/Java. For simplicity the diagram assumes the Daemon, QEI Java and the Java projects also reside on the same machine (Application code can be split on multiple machines for load balancing, and the Daemon keeps track on which machine a project is located on to route requests.). The QEI Core is a schema on the SQL Server, augmented with C++ code, called the metadata schema (From a user's perspective the schema is a regular one. However, given complexity it is necessary to use a high-level language the SQL server accepts. MySQL allows C++ user-defined functions, and Oracle Java stored procedures; both can be called from SQL without knowledge of how they were implemented). The metadata schema provides IDs for projects X and Y; the project schemas have foreign keys constraining IDs to those provided by QEI. The metadata schema provides stored procedures for a variety of QEI operations.

The projects provide two special items of code (LLF and Hooks are discussed together with the rest of the application code requirements in Section 5.).

LLF Low-level functionality consists of two stored procedures for each type of data implemented (kind in QEI parlance), that perform duplication and deletion. Besides a number of roles inside QEI, they also support the inter-zone subscription mechanism. They should be stored procedures for reasons of efficiency and portability of code across programming languages.

Hooks These are high level functions (e.g. written in Python for Project X), that are involved in the process of constructing, freezing and evolving data.

Arrows represent calls; blue ones are possible initiated requests, which can be made by either users or the Daemon. Suppose Project X is related to a utility company, and a meter reading has to be inputted manually every month. Here is a simplified sequence of the steps that would get triggered (Likely more than one hook will be involved.):

1. The date when the reading should be inputted is known to the metadata schema (see 3.2). The Daemon scans this information and decides maintenance is needed, and also that Project X is a Python project.
2. The Daemon calls the QEI Python advance( ) function (In some implementations, this step may not be isolated, therefore it would take place in the context of a batch (see 2.4)).
3. Within advance( ), the hook next( ) is called.
4. next( ) obtains the meter reading from a user from QE View via QEV Python (Any other user interface works also. QE View is used as an example.).
5. next( ) makes changes in the application schema stored on the SQL server.
6. The metadata schema needs the maintenance call update( ) after most changes involving user/resource relationships (see 3.5.1). next( ) makes this call, possibly more than once. During the call, the update( ) stored procedure may call LLFs for related data items.
7. next( ) and advance( ) finish and return control to the Daemon.

One observation is that moving code from language interfaces to stored procedures saves implementing logic repeatedly across programming languages, and gains efficiency. The language interfaces cannot be moved entirely into the database server, as they need to call hooks, which is not possible from the SQL Server. Moving the hooks into SQL is not practical, due to their complexity; it is not reasonable to ask developers to write them in anything but a high-level language. The division between LLF and hooks presents a tradeoff between efficiency and ease of programming, and the LLFs chosen are those crucial for efficiency and the zone subscription mechanism. As their implementation is often boilerplate, this is acceptable (A Python framework can automate writing the LLFs using metaclass programming techniques.).

Throughout this paper QEI will mean QEI Core together with the QEI language interfaces. The discussion of the latter has a Python bias, but all of QEI consists of generic programming techniques, and can be implemented in any high-level language that provides SQL access.

1.3 Challenges

As disclosed above, there are three principal difficulties facing such a system. The first is that when combining groups of objects, each individually correct, the result can be inconsistent, as resources can conflict. QEI uses an original approach and relies on the notion of batch editing.

The second is keeping track of historical relationships in the presence of multiple versions. The first step is associating validity intervals to data items (Section 2.1), at the end of which actions need to be taken (Working with temporal objects only is a limitation of QEI. For example, a code repository's history in a revision control system contains forks and merges, and thus it is not a linear succession. Modeling evolution patterns and rules for combing them is possible, but a discussion is beyond the scope here.). To guarantee deterministic behavior, validity intervals of resources are required to at least include those of users. Furthermore, time-driven object updates are reduced to calls to the next( ) hook, with the issue of choosing resource continuations from among multiple versions handled by again by batch editing (see Sections 2.5 and 5.2.2). This allows both manual and automatic generation of histories, the latter being useful for any realistic size system. This feature can be used to implement a daemon. Adding some elements to the metadata schema (Section metadata) may be desirable.

Finally, managing dependencies on code an execution platform is relies on the fact that they fit very well the user/resource model. This allows QEI to remain simple, as the development framework can address the issue in a language specific way (Building a project in Python is very different from C++.). This results in a relatively simple metadata schema and requirements for application code, which are both language-independent, albeit with a Python flavor. Code and execution platforms can be made 1st class citizens, and data migrations triggered by code upgrades represented naturally.

2. QEI Concepts

QEI uses batch editing augmented with time information as an approach to managing versions of data. This section describes the concepts involved, and introduces terminology used throughout the rest of the sections.

Most of this paper is intended to be readable in isolation, by combing the concept discussion with design details. by the exception being the $\mu$ and $\rho$ batch functions, and the related batch updating algorithm.

2.1 Objects and States

Information is organized into objects, each having a multitude of states. An object is something that is unique within a "reality" at a given point in time. As our physical (macroscopic) world is composed of evolving objects, there are many examples; e.g. store inventory can be an object, as it is not possible for two different inventories to be correct at one point in time. Multiple states for an object can model its history, i.e. how it evolved over time, as well as keep track of unrelated versions as needed by work in progress, differences of opinion etc.

While many evolution patterns are possible, QEI works with temporal objects, whose history is a sequence of states.

Time is modeled as a discrete integer interval T (T=[$-2^{31}$, $2^{31}-1$]⊆Z) for the prototype), and states are associated a validity interval [b,e)⊆T. Thus the history of an object consists of a sequence of states {$x_n$} with $e_n=b_{n+1}$. To represent object histories, a state can have a state in the same object assigned as its parent. More that one state can share a parent, i.e. a state can have multiple descendants, representing forking histories. however, a state can have at most one parent.

States provide trails for changes of objects. To limit trails to what is relevant, states are divided into frozen and pending (also referred to as immutable and mutable). A frozen state can no longer be changed, and will be remembered indefinitely (unless a trimming operation is performed, see Section 4.3 item 3a). A pending copy can be modified, with intermediate information irreversibly lost.

Pending states are organized into separate batches, each batch B characterized by a point in time $t_B$∈T. A batch is a candidate for a "correct reality" at $t_B$; in particular, an object cannot appear twice in a batch. When pending information is finalized, a batch is frozen. Importantly, new states can only be created within a batch. The batch is a central QEI concept, and disclosed in more detail in Section 2.4, which describe its database representation.

QEI distinguishes between creating states as a result of evolution, i.e. normal changes to the object due to the passage of time, and amendment, potentially allowing arbitrary changes. What constitutes evolution is defined by application logic (via the next( ) method, see 2.5 below, and Section 5.2.2). QEI automates evolutions, making possible data management systems in the familiar sense, i.e. they "just run" without the user being concerned with objects, states, validity intervals etc.

2.2 User/Resource Relationships

A fundamental concept of QEI is that of a user/resource relationship between two states. This is easiest described by an example.

Consider a simplified inventory consisting of 2 fresh fish and 2 lightbulbs. This can be modeled by 5 states: i for the inventory, $f_1 f_2$ for the fish, and $l_1,l_2$ for the lightbulbs. While the inventory items can be described absent the inventory, a correct description of the inventory relies on the items. One could say that $f_1, f_2,l_1,l_2$ are resources of i, while i is a user of $f_1, f_2,l_1,l_2$, and denote this relationship by ⊆, e.g. $f_1$⊆i.

Resources can be either direct, as in the above case, or indirect i.e. resources of resources. For example, a resource of a bulb could be its manufacturer, which would become an indirect resource of the inventory. QEI tracks of direct resources using the concept of dependency (Section 3.3), and infers indirect ones.

Implementations may impose a number of restrictions on user/resource relationships:

1. The directed graph with states as vertices, and edges from resources to users is acyclic. Equivalently, a user cannot be a resource of one of its resources.

This has important design consequences as to what units of information can be a state; the smaller the units the more likely cycles are to exist. Cycles can be resolved during design, which is good programming practice.

2. If x⊆y then [$b_x,e_x$)⊇[$b_y,e_y$). The validity interval of a state represents a period of time over which the state's object was constant. A constant state should have constant resources, otherwise its behavior could not be guaranteed deterministic.

3. A state cannot have more than one resource from a given object.

With the above example, suppose fresh fish are good for a week after being caught, while lightbulbs have infinite shelf life. The validity intervals and addition to inventory for each item could be:

$f_1$: {2/10/2012, . . . , 2/16,2012}, received by store 2/11/2012

$f_2$: {2/12/2013, . . . , 2/18,2012}, received by store 2/13/2012

$l_1$: From 1/15/2012 (manufacture date) to +∞, received by store 2/10/2012

$l_2$: From 1/20/2012 to +∞, received by store 2/10/2012.

One possible evolution of the inventory is $i_1, \ldots, i_6$, with the following validity intervals and items:

$i_1$: {2/10/2012}, items {$l_1,l_2$}. $l_1,l_2$ received.

$i_2$: {2/11/2012, 2/12/2012}, items {$l_1,l_2, f_1$}. $f_1$ received.

$i_3$: {2/13/2012, 2/14/2012}, items {$l_1,l_2, f_1, f_2$}. $f_2$ received.

$i_4$: {2/15/2012, 2/16/2012}, items {$l_2, f_1, f_2$}. $l_1$ sold.

$i_5$: {2/17/2012, 2/18/2012}, items {$l_2, f_2$}. $f_1$ perished and thrown out.

$i_6$: From 2/19/2012 to +∞, items {$l_2$}. $f_2$ sold on 2/18/2012.

The inventory changes both because transactions (receive and sell) and expirations of resources, for example the transition $i_4 \to i_5$ at the end of $f_1$.

2.3 Kinds

A special kind of user/resource relationship is between code and data. Every state has a kind state associated with it, representing what kind of data it is. Two typical cases are the class of an instance, and the metaclass of a class. For Python, the kind of x is type(x).

QEI provides two objects, each with one unique state that cannot be duplicated or changed, having full lifespan ([−∞,+∞]). They are:

1. QeiKind: The metaclass that should be used by any type. Corresponds to Python's type.

2. QeiState: Inherited by any application class. Corresponds to Python's object.

Pythons-like relationships hold: kind(QeiKind)=kind (QeiState)=QeiKind and QeiKind is derived from QeiState.

A kind can have different representations in multiple programming languages. Code objects such as projects or modules can also be modeled as states; the QE Framework has a notion of QE Project, which once loaded become QEI states.

Kinds enable the state retrieval approach of Section 4.1

2.4 Batch Specification

A batch is a way to combine states and reconcile resource incompatibilities. Given a time-point t∈T, a batch B at t is a set of states which is:

1. Synchronous: All states in B are valid at t, i.e. t∈[$b_x,e_x$), ∀x∈B.

2. Complete: The resources of a state in the batch also belong to the batch, i.e. x⊆y∈⇒x∈B.

3. Realistic: Any object c has at most one state in the batch, i.e. ‖ω∩B‖≤1.

Completeness makes batches stand-alone sets of data, i.e. necessary dependencies are included. As seen above (Section 2.3), code can itself is data, in which case a complete set of data is functional.

Condition 3 means no conflicts are allowed among data resources. Two items of data that use different versions of a common resource cannot coexist in a batch. To combine them, a choice of preferred version of the common resource should be made, and one or both of the items be suitably modified.

While in principle batches can be enumerated, it is not practical even for small cases. QEI uses a more flexible batch description, from which the actual batch is automatically computed.

To see why there is an issue, consider the case of two objects $X=\{x\}$ and $Y=\{y,y'\}$ with $y \subseteq x$. Starting with an empty batch $B=\emptyset$, add x. As B is complete, y is added as well, thus $B=\{x,y\}$. Now, to "use" y' in the batch, it is not clear how this operation should be handled, as no batch can contain both x and y'. If x, y'∈B', for some batch B', as $y \subseteq x$, by completeness y∈B', hence B'∩Y contains at least two elements, contradicting realism.

QEI resolves this situation using the notion of equivalent states. Two states of the same object are said to be equivalent (written $s \simeq s'$) if they are identical except for allowing the replacement one or more resources with states from their respective objects. In the above example, a clone of x' of x can be created, and the resource y replaced with y'. $B'=\{x', y'\}$ is a correct batch, and $x \simeq x'$.

Importantly, the batch description remembers that x and y' are the desired states of the batch, while x' is a utility state, called an autoclone. Should a user change mind and want y to be used again, the batch reverts to $B=\{x,y\}$.

This process requires that states have a duplication mechanism (Section 5.1.3) and that resources can be replaced (Section 5.1.1). The central role played by batches in QEI makes these requirements useful (except for built-in states, e.g. QeiKind, Section 2.3).

This process requires that states have a duplication mechanism (Section 5.1.3) and that resources can be replaced (Section 5.1.1). The central role played by batches in QEI makes these requirements useful (except for built-in states, e.g. QeiKind, Section 2.3).

A batch description consists of:

(I) Generators: These are objects which appear in the batch. Non-generator objects appear in the batch only if they are a needed resource of a generator object. Also referred to as IN/AUTO objects.

(II) Models: A set of states, no two of the same objects, called models, to be "used" by the batch.

The models do not need to be compatible, providing a "mix-and-match" approach to combining states into batches. The above example is represented by a set of generators $G=\{X,Y\}$, and models $m_X=x, m_Y=y$ or $m_X=x, m_Y=y'$.

A batch is computed by reconciling the models, starting with the generators. The resulting batch entries are called resolutions, and they satisfy the following:

(A) Every resource of a resolution is itself a resolution in the same batch.
(B) Every object has at most one resolution in the batch.
(C) For every resolution, the description contains a model from the same object.
(D) An object's model and resolution should be equivalent states.
(E) Every generator object appears in the batch.
(F) The resolution of every non-generator object should be an (in)direct resource of a generator object's resolution.
(G) Any pending model is a resolution.

(A) and (B) simply state that resolutions form a batch. It is important to remember that models are part of the batch's description, while the resolutions are its entries.

(C) prohibits QEI from guessing; if an object is needed, a model should be specified. Even if the object were to contain a unique state, using it automatically is incorrect, as new states can be created for reasons independent of the batch in question. (D) limits the changes made to models to resource replacement within the resource's object. Resource replacement is reversible, so no information is lost.

Conditions (E) and (F) insure the batch consists of as few objects as possible. Consider the case of three objects $X=\{x\}, Y=\{y\}, Z=\{z\}$, with $z \subseteq x, z \subseteq y$. Starting with $G=\{X, Y\}$, the batch consists of $\{x,y,z\}$. If X is no longer to be a generator, the batch becomes $\{y,z\}$, as z is still needed. However, for $G=\emptyset$, one can get $B=\emptyset$.

This is practically important, as it makes adding an object to a batch reversible. To highlight the importance, consider managing installed software. Often one item of software requires other items to be installed, which can be represented as user/resource relationships. X, Y and Z above can represent items X and Y which need Z to function, while Z is not of interest in its own right (it is not a generator). Ideally Z should be kept only if at least one of X or Y is installed, but typically removing Z is left for the human to remember.

To compute a batch, three tasks need to be performed:

1. Compute objects: Starting from the generators, and following the resources of models, determine the objects present in the batch.
2. Determine which frozen models need auto-clones: Cloning everything is inefficient; the criterion used is to clone frozen models that have at least one (in)direct resource that is not a model. This is the minimum necessary. Pending models are never cloned, hence condition (G) above.
3. Adjust resolution resources: Resolutions can be modified to use other resolutions. All resolutions that need modifications are pending, either because the model is, or because an auto-clone has been created.

While a batch can be computed from its description by relatively simple algorithms, it is computationally expensive, and QEI uses an incremental algorithm instead. It is considerably more technical, but the efficiency gains are substantial.

2.5 Advancement

As mentioned above, QEI distinguishes between evolution of data and arbitrary edits. Evolving data is created by advancements, the process of generating a descendant state at the end of the validity interval of the parent. The basic idea is that if the parent is known, and the continuations of all resources of the parent are also known, there is enough information to construct the descendant. The process does need to be deterministic; manual input can be required, or recovering data from remote sources.

With the store example of Section 2.2, selling products and ordering items from suppliers represent evolution. Such logic would be put in the next( ) method of the classes modeling the inventory, fish and lightbulb concepts, which QEI assumes every application class provided to perform descendant construction (see also 5.2.2).

To see the difference between evolution and amendment, consider how and accounting mistake should be treated. If the desired effect is restating the books from the point when the mistake occurred, it will not constitute evolution. If on the other hand the next( ) method of inventories allows inputting corrections, it becomes business-as-usual, and hence evolution.

To simplify writing next( ) methods and also provide automation, QEI takes on the responsibility determining what resources next( ) should assume for the new state. To see why this is a concern, recall that for a resource $y \subseteq x$, $[b_x, e_x) \subseteq [b_y, e_y)$ and hence $e_y \geq e_x$. Looking to extend x beyond $e_x$, the continuation of y at $e_x$ can be y itself if $e_y > e_x$, or a descendant of y, if $e_x = e_y$. With multiple versions present, there is no guarantee at y has a unique descendant, and therefore advancing x may require a choice. Furthermore, is possible the resource continuation choices are incompatible, i.e. there are conflicts among their own resources.

To address these issues, QEI performs advancement within a batch, into which the desired continuations are added (using Section 4.2 item (2e)), either manually or automatically. If this step succeeds, the chosen continuations are known to be compatible. This is followed by calling next( ), which receives the resource continuations as arguments.

The conditions for the advancement of a state x into a batch B are the following:
1. $e_x = t_B$. Such an x is called a tangent state.
2. The object of x does not appear in B.
3. For every direct resource y of x, the following is true:
    (a) B contains a state y' from y's object (unique by batch definition).
    (b) Either y=y' or $b_{y'} = e_y = t_B$ and y is the parent of y'.
next( ) is invoked only if these conditions are met.

2.5.1 Merge Advance

As mentioned above, next( ) is not deterministic, and it may involve manual input. This can create difficulties when correcting histories of states, as advance may require duplicating data input work.

Suppose daily temperatures are collected at certain locations. This can be modeled by two classes, Location and Reading. An instance of reading might consist of temperature, time and location, while Location might have coords and stationManager. A dependency readingLocation can tell QEI each instance of Reading has an instance of Location as a resource.

A sequence of readings at the same location represents an object, with each reading having the prior reading as a parent. Regarding successive observations as a history allows implementing correctly historical measures, e.g. "change-from-prior". The validity interval of Reading can enforce data collection, and Reading.next( ) can request the observed temperature as input. Location instances will likely have long validity intervals, as changes are infrequent.

Suppose now that after collecting a year of daily observations at a location, an implementation determines that the station manager was replaced six months ago, and would like to correct the data. Just using advancement, this is possible but labor intensive and error prone. The steps, based on the batch operations listed in Section 4.2, are:
1. Fork at correction time:
    (a) Create a batch at the time when the station manager changed (a).
    (b) Add the location into the batch (2e).
    (c) Clone the location (2c).
    (d) Edit the location, correcting the stationManager field (3a, 3c, 3b).
    (e) Add the reading to the batch, with ADAPT flag (2e).
    (f) Freeze the batch (1d).
2. Advance the new branch, at each step copying the previously observed temperature reading (4c).

If next( ) is not deterministic, amending a parent is not easy. As both the new parent, and the state itself contain useful information, any automatic solution should use both. There is no universal answer, and aggregating the two should be part of the application logic.

QEI addresses this problem via its merge feature, a variation of advancement that uses non-deterministic information from a merge source, an additional state of the object valid at the advance time. The optional argument mergeSource in next( ), None by default, conveys that a merge is in progress (see Section 5.2.2 item 4).

Many practical cases can be covered by two basic approaches:
1. Make next( ) deterministic. The mergeSource parameter is ignored.
2. Make the state a pure input state, with its parent irrelevant. Merge simply adds the merge source into the advancement batch, with ADAPT flag (see Section 4.2 item 2e), and returns the resulting resolution.

In the above example, both Reading and Location can be pure input states

Using the merge feature, the amendment Step 2 above is automated (forking, i.e. Step 1, stays the same). Additionally, given code is a state and a resource of data, new functionality can be added when the amendment is done, postponing writing merge code until needed.

2.5.2 Automating Advance and Merge

It is not practical to do all advances and merges manually. However, automation runs into the problem of choosing resources. QEI uses the notion of natural descendant to provide a way to automate most advances and merges.

A state x can have a unique natural descendant n(x), and it is required x is the parent of n(x), and $e_x = b_{n(x)}>$. This allows advancing all the resources of a state "in-bulk", using and producing only natural descendants. The results can be iterated upon, doing multiple time intervals with one command.

Natural descendants should not be confused with correct histories, as any parent/descendant relationship can be checked by validation; they are simply preferred choices. A sequence of natural descendants can be thought of as "published data".

The exact algorithm is described in Section 10.2 items 2c and 2d. Natural descendants can handle multiple branches of versions, and only "fork points" should be treated manually. The example below should give some intuition for the interaction between natural descendants and advance/merge.

Let X and Y be two objects with states $x_0 \subseteq y_0$ having $b = b_{x_0} = b_{y_0}$, 0, $e_{x_0} = e_{y_0} = 1$, and suppose a natural advance of $y_0$ has been done, resulting in states $x_i, y_i, i=1, \ldots, 99$, each valid on [i,i+1], with $n(x_i) = x_{i+1}$, $n(y_i) = y_{i+1}$.

Implementations may fork the object X at 20. For that purpose implementations may create a batch B at 20, put $x_{20}$ into it, modify $x_{20}$ into $x_{20}'$, and freeze B. Implementations can do a natural advance starting with $x_{20}'$, which does not have a natural descendant, and obtain e.g. $x_{21}', \ldots, x_{50}'$; the validity intervals may or may not be the same as for $x_i$, but for simplicity it could be assumed to be the same. The reason for stopping at 50 is that perhaps due to the changes in $x_{20}'$, next( ) fails for $x_{50}'$. Thus, $n(x_i') = x_{i+1}'$, $i=20, \ldots, 49$, and thus have constructed two separate branches of natural descendants for X.

Implementations may update Y using iterated natural merges. There is a manual step involved, to create the head of a new Y branch. Create a batch, B' also at 20, add $x_{20}'$ to it first, then add $y_{20}$ to it using put with ADAPT flag. This will create a state $y_{20}' \in B'$ with $x_{20}' \subseteq y_{20}'$. After freezing B', an implementation can perform an iterated natural merge on $y_{20}'$ with $y_{21}$ as the merger source. The result will be a sequence $y_{21}', y_{22}', \ldots$.

It is worth noting what happens at t=51. $x_{50}'$ does not have a natural descendant; a 50 merge-advance will be attempted, using $x_{51}$ as a merge source. If that succeeds, the x' and y' branches are extended beyond 51.

If desirable, $y_{20}'$ can be designated the natural successor of $y_{19}$ (Section 4.3 items 2b 20 and 2a). Any state that uses the Y sequence and does a natural advance will see this as a smooth transition, which does not break automation (see comment in Section 4.3 2(c)i).

Designating $y_{20}'=n(y_{19})$ can cause a conflict. Suppose another object Z has a state $z_0$ valid on [0,1), which has both $x_0$ and $y_0$ as direct resources. If an implementation performs a natural advance of $z_0$, it encounter a problem at t=20. Because, $x_{20}' \subseteq y_{20}'=n(y_{19})$ and $x_{20}=n(x_{19})$, and thus the natural descendants of the resources of $z_{19}$ cannot be combined in a batch at t=20, and natural advance will fail.

The conflict is real, as implementations may have given contradictory instructions as to how to advance, by saying the natural descendants of $x_0$ and $y_0$ should be both followed. This would not be the case if only $y_0$ was a direct resource of $z_0$, with $x_0$ an indirect resource; in that case the advance instructions are to follow the natural descendants of $y_0$, whatever they may come with. The stopping condition in Section 4.3 2(c)i may be used to avoid involving $x_{20}$ 2.5.3 Controlled Resources While the requirement that the user/resource graph is acyclic is fundamental to QEI, there are cases when it is necessary that a user modifies a resource while there are both pending. The user/resource graph is still acyclic from a validation standpoint, but from a construction standpoint the resource also depends on the user. Consequently, it may be impossible to change the resource without involving the user. Such a relationship is called a controlled resource.

To understand the necessity, consider the following two application classes:

Power Consists of three fields a, n and b, and validation requires $a^n=b$. It also has a calculate( ) method, which sets $b=a^n$.

PowerLink Has two fields of type Power, called from and to. Validation requires that from.b=to.a, linking the output of from to the input of to. It also has a method calculate( ), which sets to.a:=from.b and then calls to.calculate( ).

Let now x,y be states of kind Power, and l a state of kind PowerLink, with l.from=x and l.to=y. As an example, assume x.n=2, x.a=2 and y.n=3. The only valid combination is x.b=y.a=4 and y.b=64.

This setup only makes sense if l and y are pending simultaneously. y pending implies l is pending, but the converse is not required. However, without y pending, l being pending is useless, as there is no way to correct it if validation fails.

QEI represents this relationship as y being a controlled resource of l. Controlled resources are taken into account when freezing a batch, with two consequences:

1. Every controlled resource of a pending state should also be pending. If it is not, freezing the batch will fail.
2. The graph of pending states of the batch, with user/resource relationships as edges, is augmented with an edge going from each controlled resource to its user. The resulting graph is no longer acyclic, as edges go both ways between some vertices. The cyclical components of this graph form an acyclic graph, which can be computed using the well-known Tarjan's algorithm (see Wikipedia). For each cycle C the following are done:
   (a) The validity intervals of all states in C are all set to the minimum among states in the cycle. This insures that when advancing the user, the resource is also pending. It is logical that a resource whose construction depended on a user should not be valid beyond that user.
   (b) A unique ID is assigned to the cycle, and upon freezing put in the column cycle of the state table. The purpose of this is to facilitate correcting the states of the cycle, which may require knowing they are related.

When creating new versions of frozen states that have a non-NULL cycle ID, looking at other states that share the same cycle ID may or may not be necessary. In the above example, y and l form a cycle, and both depend on x. If an implementation starts to edit y.a:=4.1 to see the effect y.b=68.921, irrespective of how y.a was arrived at initially, the relation to l is irrelevant.

On the other hand, suppose a version xx of x is created in a batch B with xx.a:=3, and xx.calculate( ) is run. Next l is added to B using the ADAPT flag, which creates a pending version of ll of l, and brings its resource y into B. Validation now fails, as x.b=9 and y.a=4. Calling ll.calculate( ) also fails, as ll's controlled resource y is not pending. Looking at the cycle of l shows editing y in B is necessary. Once a copy yy of y is created, ll.calculate( ) works and computes yy.b=729.

Automated advance and merge using natural descendants can be used once a correct alternate state is constructed, as all states in the cycle will advance simultaneously, given (2a) above. Controlled resources place an additional burden on the forking process (mitigated by storing the cycle ID), but not on automation. Nonetheless, they should be used only when absolutely necessary. A typical case is implementing spreadsheet-like features, where the nature of cycles is not known when the code is developed, but only at run-time.

Every kind is required provide controlled resources via the controlled( ) method, which is part of low-level functionality (see 5.1.3, item 3c).

2.6 QEI Road Map

As previewed in the introduction, QEI functionality (aside from renaming states and objects, Section 4.3 item 1) can be divided into two categories:

(I) Working with states at a fixed time-point, provided by the batch operations of Section 4.2. Some functionalities include:
   (a) Operations to manage the batches themselves (Section 4.2 item 1). The most important ones are freeze, which converts pending states into frozen, and validate to enforce data correctness.
   (b) duplicate, reload and delete, for practicality.
   (c) reserve and release, which control editing access (Section 4.2 item 3).

(II) Working with histories. Creating descendant states comes in two flavors:
   (a) Single descendant (Section 4.2 item 4). New states are constructed with advance and its variation merge. make_head and make_descendants enable starting new branches.
   (b) In bulk. Consists of natural_advance and natural_merge, which automate iterating advance and merge. The paths taken automatically are controlled with make_natural and cancel_natural.

As a part of managing histories, set_intervals (Section 4.2 item 1g) determines validity intervals when based on those of resources. The batch time can be changed with set_time (Section 4.2 item 1c).

Finally, detach and kill are the sole means of reducing the database.

Each category each impose requirements on data:

(I) (a) On states:
   i. Duplication. Duplicating states is needed by batch updates and user-initiated duplications (Section 3.5.1).

ii. Deletion. Automatically duplicated states need to be deleted automatically as well.

iii. Validation. QEI guarantees resources are validated before users. The application can ignore this requirement by declaring to QEI all data valid, and taking over the task itself.

(b) On relationships:

i. Enumeration. A way to enumerate a state's resources. Used throughout.

ii. Monitoring. To keep batches correct, changes among resources should be kept track of. See Section 3.4.

iii. Replacement. Being able to replace one resource of a state with another, during batch updates. Additionally, the delete operation may need to delete resources, if dependencies use setNull or delete flags (see 3.3).

iv. The user/resource graph should be acyclic. See Section 2.2 restriction 1).

(II) (a) Retrieval. To work with any application logic, states need to be recoverable from their ID.

(b) next( ). A method that constructs descendant from the parent and continuations of resources. It is the keystone of (II).

(c) Controlled resources. Supports QEI's approach to creating histories in situation where resources need to be modified by users during next (Section 2.5.3)

These requirements are met by imposing some constraints on application data (Section 5), and storing the necessary metadata. The imports, kind, inheritance, dependency and resource_change tables, together with state.kind_id (FIG. 1B) all serve this end. This design by no means unique, and has a definite Python influence.

The batch, counts, for_update and account tables support (I), with the exception of the counts.crossleft and batch.t_at columns. Additionally, state.rescount is an optimization feature for batch updating. The remaining portions of the metadata schema support (II).

3. The Metadata Schema

The metadata schema enables the QEI operations (Section 4). Application data is stored separately in application schema, which the metadata schema links with in three ways:

1. Provides ids: Creating states is done through QEI operations or the newObject stored procedure. Application data schemas use foreign keys enforce correct ids (Section 5.1).
2. State retrieval: States can be accessed based on id, via the main_table column of the kind table (Sections 4.1 and 5.1).
3. Resource monitoring: Metadata includes resource counts that are maintained via dependency triggers on application data tables (Sections 3.4 and 3.3).

This separation allows QEI to function without knowledge of application schema.

3.1 Overview of Tables

Figure 1B:
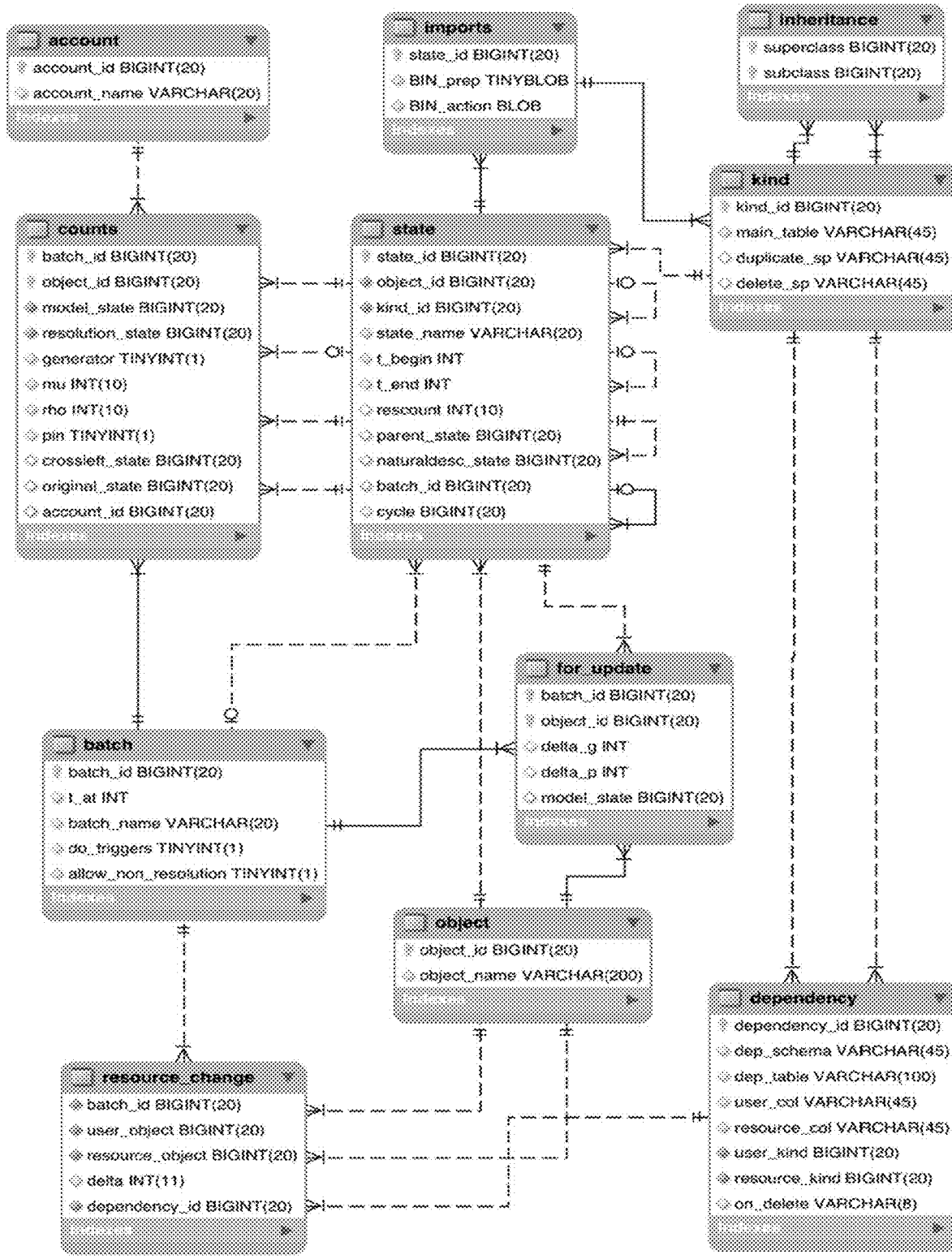
FIG. 1B is an example of a metadata schema.

The metadata schema can be seen in FIG. 1B. The table's descriptions are as follows:

1. object: Objects, in the QEI sense of Section 2.1. The object_name column is a string for human use, and has a UNIQUE index.
2. state: Implements states (see Section 2).
3. account: Implements a concept of user account. Supports a mechanism of exclusive editing (Section 4.2 item 3).
4. batch: Implements batches. See 2 and 2.4.
5. counts: Companion of batch, storing per-object details, including the $\mu$ and $\rho$ counting functions (see 3.5.1).
6. dependency: Stores the user/resource relationship specifications. See 2.2 and 3.3.
7. resource_change: A table to store changes in user/resource relationships, to be used for updating the counts table. Triggers on tables containing dependencies insert in this table, and batch recalculation (Section 3.5.1) consume the entries.
8. for_update: Table to communicate arguments to update( ) (see 3.5.1).
9. imports: Information as to how states are to be retrieved, intended for code objects. These are states that can be retrieved directly, without accessing their kind first.
10. kind: Represents kind (Section 2.3). Every kind state has a corresponding line in the imports table, i.e. be directly retrievable. Besides import information used for retrieval (Section 4.1), it also stores the names of the delete and duplicate stored procedures (Section 5.1.3).
11. inheritance: Stores inheritance relationships among kinds. It is used to compute the dependencies of a kind, which are inherited (Section 3.3), and for enforcing kind checking for polymorphism. Inheritance is a dependency between kinds, and has an associated line in the dependency table.

3.2 the State Table

Given the concept of state represents all data in QEI, the state table is central to its functioning, as can be seen by the number of foreign keys tied to state_id, directly or indirectly. The column descriptions are:

1. state_id: Unique id for each state.
2. object_id: The id of the unique object the state belongs to.
3. kind_id: The id of the kind of the state (see 2.3). This appears in the kind table, but is ultimately a also a state.
4. state_name: Human-readable version name. Can be shared among states of different objects, e.g. to mark branches of production, testing etc. The default name of a state is --.
5. t_begin: Beginning of validity interval. See 2.
6. t_end: End of validity interval.
7. rescount: The number of direct resources of the state (see 2.2); only used for frozen states, to speed up batch recalculation (see 3.5.1 and 3.5.2 item 3(a)iii).
8. parent_state: Stores the unique parent state (see 2), if there is one. parent_state belongs to the same object.
9. naturaldesc state: Every state can have a unique natural descendant, a state designated as the default descendant for automatic advance and merge operations (see Section 4.3, item 2, and Section 2.5.2). Belongs to the same object, enforced by a foreign key.
10. batch_id: For pending states (2), the id of the batch it belongs to, NULL otherwise.
11. cycle: This columns pertains to the notion of controlled resource (see 2.5.3). During the advance operation (Section 4.3 item 2c), it is possible for users to modify resources, if they are controlled. If cycle is not NULL, it is a unique ID shared among states that were part of the same cycle when freezing (see Section 4.2 item id.

3.3 the Dependency Table

The user/resource relationships discussed in Section 2.2 have a 2-tier representation:

(I) Description of the possible user/resource relationships among a pair of kinds, and how they are to be identified in the application schema. Each possible relationship among two kinds is a dependency, which has exactly one entry in the dependency table.

(II) Actual user/resource relationships, which typically reside in application schema (an exception is the superclass/subclass relationship residing in the inheritance table). They are normal entries in the application schema, interpreted as user/resource relationships because of declared dependencies.

Each dependency corresponds to a specific pair of columns in one table. The columns of the dependency table are:
1. dependency_id: Unique identifier.
2. dep_schema: Name of the schema where the dependency is located.
3. dep_table: Name of the table the dependency appears in.
4. user_col: Column to be interpreted as the state_id of the user state.
5. resource_col: Column to be interpreted as the state_id of the resource state.
6. user_kind: The kind_id of the user state.
7. resource_kind: The kind_id of the resource state.
8. on_delete: A flag describing the action to be performed on the user when a resource is deleted. Should be one of restrict, cascade, setNull, delete. The first 3 have the SQL meaning.

An example of delete is a container which allows deleting its entries by simply removing the line corresponding to the relationship in the database.

This column is used by the delete operation of Section 4.2, item 2f.

Dependencies are inherited. If (A,B) and (C,D) appear in the inheritance table, a dependency for A→C will apply to B→D.

Based on the dependency table, the resources of any state s can be obtained algorithmically, without using application code:
1. Read the kind field k of s from the state table.
2. Read the bases of k in the inheritance table, which will be a list L={$b_1, \ldots, b_n$}, including k itself (see Section 3.1 item 11).
3. For each base b∈L, read its dependencies from the dependency table, i.e. the lines which have b=user_kind.
4. For all dependencies thus obtained, select from the dependency's table (the name in dep_table.dep_schema) the lines that match s in the column specified by the string user_col; the resource_col column entries of the selected lines are resource IDs.

3.4 Monitoring Resources

The correctness of a batch depends on the models' resources. Dependencies declared in the dependency table are monitored by triggers, which log changes in the resource_change table. Its columns are:
1. batch_id: The batch of the user state, necessarily pending, where the change occurred (see 2 and 2.4).
2. user_object: The object_id of the user state.
3. resource_object: The object_id of the resource state.
4. delta: The change in the resource count. This will typically be 1 or −1.
5. dependency_id: The dependency which detected the change. A change can be picked up by more than one dependency, and it is crucial for computing μ and ρ to count multiplicities correctly.

The table resource_change is a temporary table, and changes cannot be committed if it is not empty (see 3.6).

INSERT, DELETE and UPDATE are created by running the dependency triggers stored procedure of the metadata schema when an application schema is added to QEI, consolidating the actions that need to be taken on account of the dependencies of the table. For this reason, tables in application schemas containing dependencies cannot have triggers (see 5.1.1). The triggers generates a +1 signal for INSERT, −1 for DELETE, and one or both for UPDATE. (changing a resource causes one user count to decrease and another to increase).

3.5 Batch Representation

Batches are represented by one line in the batch table, and a set of lines in the counts table, one for each object of the batch. (an object can have only one state in a batch, Sections 2 and 2.4).

The columns of batch are:
1. batch_id: Unique batch identifier.
2. t_at: The batch time. All states in the batch is valid at t_at.
3. batch_name: A human-readable name. Has a UNIQUE index.
4. do_triggers: Flag determining whether user/relationship monitoring triggers are in effect. Triggers are off during batch recalculation (see 3.5.1) and when duplicating batches (Section 4.2, item 1b). False is always temporary.
5. allow_non_resolution: False causes assigning a non-resolution as a resource to fail right away in the trigger (Section 3.4).

According to batch properties, only resolutions can be resources, and given put requires choices (Section 4.2 item 2e), it is better not done automatically. However, if multiple operations are consolidated (Section 3.6.1), it can be useful to suspend this check. One example is to create and assign an object one go.

True is always temporary, thus one connection's choice does not affect others.

The batch description and resolutions are stored in the counts table:
1. batch_id: Batch the line pertains to.
2. object_id: Object in batch.
3. model_state: The object's model. Cannot be NULL by property (C), Section 2.4.
4. resolution_state: The object's resolution. Cannot be NULL.
5. generator: True if the object is a generator.
6. mu: User count, with +1 if the object is a generator. If 0 is reached, the object is deleted from the batch.
7. rho: Autoclone trigger.
8. pin: A safety feature. If True, the object's model cannot be replaced, or an autoclone created.
9. crossleft_state: Distinct from the batch editing, this is used to keep track of historical relationships among states. Discussed below in Section 3.5.3.
10. original_state: Some states are created as a copy of another one. Original_state stores it to enable reload (Section 4.2, item 2d). The original is a state of the same object for a result of clone_frozen (Section 4.2, item 2c), but not for duplicate (Section 4.2, item 2b).
11. account id: Id of account that has the resolution reserved for edit. States, even pending, cannot be modified unless the user reserves it for edit first. See Section 4.2, items 3a and 3b.

3.5.1 Batch Updating

Batch updating is at the core of batch editing, as all batch operations perform this function, either upon completion or delayed, as in the case of consolidation (see 3.6.1). It is implemented as a stored procedure update(batch_id). Its effect is emptying out the resource_change and for_update entries for the batch, updating μ and ρ, eliminating obsolete objects, recomputing resolutions, and adjusting resolutions to insure consistency. The user/resource relationship graph is checked to be acyclic.

Being able to implement update( ) as a stored procedure is the main reason all kinds have duplicate and delete stored procedures rather than hooks. (see steps 4g and 6 below, and 5.1.3). Due to the complexity of the algorithm, a pure SQL implementation is difficult, and high-level code residing on the database server is the better option, e.g. MySQL C++ user-defined functions or Oracle Java stored procedures.

The columns of for_update are as follows:
1. batch_id: Batch the line pertains to.
2. object_id: Object to change generator or pin status, or model.
3. delta_g: Can take values +1, −1 or 0. +1 means make the object a generator, unless it is already, with −1 the opposite effect. 0 is ignored.
4. delta_p: Same as above, to change the object's pin status.
5. model_state: Model to be added, or to replace the current one; object_id correspond, enforced with foreign key.

Many of the operations described below in Section 4.2 are expressed in terms of producing inputs for update( ).

3.5.2 the Update( ) Algorithm

The algorithm used by update is incremental, as potentially very large batches need to be updated after small changes.

The propagation scheme is implemented as a directed graph routine propagate( ). The inputs are:
1. retrieve: A pointer to a function that takes a vertex id as an argument, and retrieves its new edges, old $f$ (the useful value, e.g $\mu$ or $\rho$) its signal function $\epsilon$.
2. delta: The changes to be propagated onto $f$.

The routine returns the graph of vertices touched in the propagation process. For each vertex old and new values of $f$ are returned, allowing to compute the $f$-signal of the vertex x as $\epsilon(x, f_{new}(x)) - \epsilon(x, f_{old}(x))$.

propagate( ) is run twice, once for $\mu$ and once for $\rho$.

The steps of the update algorithm are as follows:
1. Un-pin objects with deltaP−1. This step is done first to allow un-pinned model to be replaced in the same pass.
2. Recompute $\mu$:
   (a) Compute the $\delta_\mu = \delta + (K_s - K_r)\mu$:
      i. Create a dictionary deltasForMu with keys object IDs, initialized with entries from deltaG that are not redundant. If an object is specified with +1 in deltaG, and is already a model, it is ignored, and similarly for −1. This steps computes $\delta$, the first term of $\delta_\mu$.
      ii. Construct a directed graph g to store changes in generators and model resources (regarded as objects). Vertices are associated with objects, and are labeled with their current $\mu$, or 0 if they do not appear in the counts table. Edges represent resources of models, regarded as relationships between objects. The graph is created by adding edges in three steps:
         A. Tally resource changes by user/resource pair objects, and add an edge in g, labeled with the total change for that pair. This computes the s-r portion coming from pending model changes.
         B. Compute models to be deleted. For every deleted model $\omega$, add an edge (or add to the label of an existing edge) for every resource, with label−1.
         C. For added models, perform as in (B), using +1 instead.
         The graph edges now store s-r.
      iii. For all vertices in g compute the sum of the incoming edge labels over vertices with positive labels. This is $(K_s - K_r)\mu$, as the $\mu$ propagation uses $\epsilon$=sgn, and has summed up only vertices with positive labels (remember the label of the vertex $\omega$ is $\mu(\omega)$).
      iv. Add the summation result from the prior step to deltasForMu. This is the correct $\delta_\mu$.
   (b) Call propagate to recompute $\mu$ and obtain the $\mu$-signal sgn($\mu'$)−sgn($\mu$). $\epsilon$=sgn is used. The propagation is done over current models with current relationships; changes are already in the database, and are seen by the retrieve argument passed to propagate( ).

This step detects if models are missing, e.g. there is no model for a resource of a generator object's model, and can raise an exception.

3. Recompute $\rho$:
   (a) Compute $\delta_\rho = (\chi_C - \chi_B)(1 + K_r\rho)$:
      i. Compute B, the set of models that have been replaced, or whose object has become redundant ($\mu'$=0).
      ii. Compute C, the set of new models that are not redundant (i.e. their object survived the $\mu$ calculation).
      iii. For all elements of x∈B∪C, compute the sum of the multiplicity of resources y such that $\rho(y)=d(y)+1$, where d(y) is the number of direct resources of y. As computing $\rho$ involves only frozen states, d(x) can be read from state.rescount, whose purpose is providing this efficiency gain. The sum simply follows the definition $K_r\rho$.
      iv. Compute $\delta_\rho$ according to the formula above.
   (b) Pass $\delta_\rho$ to propagate( ) to recompute $\rho$, and compute the $\rho$-signal.
4. Update the counts table:
   (a) Revert autoclones that are no longer needed. Dictated by $\rho$-signal−1. The previous autoclone will be deleted at Step 6b.
   (b) Delete lines for objects that have become obsolete. Dictated by $\mu$-signal−1.
   (c) Create lines for new objects. Dictated by $\mu$-signal+1.
   (d) Update $\mu$ for objects that exist before and after.
   (e) Update generator flags.
   (f) Replace models where necessary. These are models in mPlus whose object was not deemed redundant.
   (g) Create necessary autoclones. Dictated by $\rho$-signal+1. This step requires each kind to have a duplicate stored procedure.
   (h) Update $\rho$.
   (i) Set pin to True where deltaP is 1.
   (j) Check the user/resource graph for cycles. As frozen states can only have frozen resources, it suffices to look for cycles among pending states.
5. Adjust the resources of pending resolutions (keep in mind pending models are always resolutions). Done for:
   (a) New pending models, as they are a priori inconsistent with the resolutions.
   (b) New autoclones, as all their resources are frozen.
   (c) All resolutions, for resources whose objects' resolution has changed.
6. Delete obsolete states. These are:
   (a) Pending models for obsolete objects.
   (b) Pending resolutions of frozen models that are no longer necessary.

This step requires each kind to have a delete stored procedure.

3.5.3 the Batch.Crossleft Column batch.crossleft supports make_head and make_descendant for pending states (Section 4.2 items 4b, 4a), by storing a potential parent, which is always a frozen state.

For a frozen state x, the crossleft is defined as:
1. Itself, if $b_x<t\_at$.
2. The parent of x (including NULL), if $b_x=t\_at$.

For a pending state, the crossleft is NULL except for the following cases:
1. The state was created by advancing a state y with $e_y=t\_at$. The crossleft is y.
2. The state was created by clone_frozen. The crossleft is that of its original. If x' is a clone of x with $b_x<t\_at<e_x$, the crossleft of x' is x, even though x and x' overlap. As states represent intervals of time when the object was constant, a descendant y of a state x with $b_x<b_y<e_x$ represents a fork. The state x at $b_y-1$ has two successors: the constant one, i.e. x at $b_y$, and y at $b_y$.
3. The batch was created by duplicate batch, and the object had a non-NULL crossleft in the original batch, which was copied.

Make_head and make_descendant toggle the parent between crossleft and NULL.

3.6 Concurrency

Resource monitoring imposes some restrictions on concurrent access:

(A) Batch updates should be done sequentially. This is enforced by a SELECT . . . FOR UPDATE on the batch table.

Necessary because the effects of update( ) on the counts table cannot be anticipated. One example is cycle detection: two changes, working from the same data in parallel, can each be OK, but together produce cycles. This cannot be detected unless each update finishes before the next one is started.

(B) Committing a connection requires empty resource change and for_update tables.

Necessary because update( ) should eventually be run, and it can fail (e.g. cycles are detected); in that case changes to states should be rolled back.

(C) Changing resources require a state lock. This is acquired by a SELECT . . . FOR UPDATE on the kind's main table.

Necessary because monitoring differences on parallel process produces incorrect results. Suppose a variable x starts with the value 1, and two processes P and Q, working in parallel from the base value, change x to 2 and 3 respectively, with Q committing last. The end result is x=3, with $\Delta x=2$. However $\Delta x_P=1$, $\Delta x_Q=2$, hence $\Delta x_P + \Delta x_Q = 3 \neq \Delta x$. This applies to a batch, for example:

(a) Process P deletes resource x of state y. The trigger is run, and a −1 is recorded in resource_change, visible only to P.
(b) Process Q does the same operation, with the same effect.
(c) Process P obtains the batch lock.
(d) Process P runs update( ), and $\mu(x)$ is decreased by 1.
(e) Process P commits.
(f) Process Q obtains the batch lock.
(g) Process Q runs update( ). $\mu(x)$ is decreased again by 1, becoming incorrect.
(h) Process Q commits. The counts table is irreversibly inconsistent.

The above restrictions result in the following typical sequence of actions:
1. Get a database connection.
2. Acquire locks on states that need to be modified.
3. Modify state resources. Triggers will run, creating entries in resource_change.
4. Make changes to generators, pins and models. Creates entries in for_update.
5. Acquire batch lock. Delaying this until this point allows work to proceed in parallel on different states.
6. Run update( ). Empties out resource_change and for_update. If it fails, all work will be lost.
7. Commit. Will fail if attempted before update( ), unless the tables are empty.

With locking done via SQL, deadlock detection is the responsibility of the database management system.

3.6.1 Consolidation

For a framework, it make sense to have batches operate in two modes:
1. Automatic: Every operation that requires running update( ) does so immediately. This mode should use allow_non_resolution=False, requiring an object to be added to the batch before it can be assigned as a resource.
2. Consolidated: update( ) is explicitly run.

Automatic updates are simpler, but less efficient. Besides requiring an extra task, consolidating has the disadvantage that incorrect steps are not detected until the end. Consolidation is preferable for multiple operations with update( ) unlikely to fail, e.g. constructing large arrays of states.

4. QEI Functionality

This section describes, inter alia, the functionality of QEI, and gives some implementation details, including for state retrieval mechanism, used for any operation that cannot be carried out using metadata alone, and then list individual operations.

Batches (Section 2.4) are used for most operations that create new states, the exceptions being Section 4.3 item (1); item (2c) and (2d) rely on their batch counterparts.

4.1 The retrieval sequence

All the information of a state is accessible from its id. Its kind can be recovered from the state table, and the name of the state's main table read from kind.main_table. The kind bases are in inheritance, and hence all dependencies.

Constructing actual instances of application classes is programming-language specific. For Python, the sequence is:
1. If the state appears in the imports table, recover the two strings prep and action. Both strings are interpreted as code. prep is intended for imports, while action return an Python object of the correct type. The code in action can assume the following two variables are in scope:
   sid: The id of the state to be recovered.
   conn: A connection to the database.
2. If the state does not appear in the imports table, its kind, guaranteed to exist in the imports table, is obtained as above. The kind is a Python class, that understands its own representation, can retrieve the state.

The format of the imports table is flexible, and columns could be added to support other programming languages.

Batch Operations
1. Managing batches:
   (a) new_batch: The batch time and a set of initial states can be specified, e.g. for built-in states. The initial states are added using the put operation (item 2e below) with the EXACT flag.
   (b) duplicate_batch: Creates an exact copy of the batch. As batches do not share pending states, every pending state is duplicated.
   (c) set_time: Change the batch's t_at to t'. Can only be done if there are no pending states, and t,t'∈(b,e) for all frozen states. It is a trivial change to the batch, as the conditions insure the counts table entries remain unchanged, in particular the crossleft field. It is mostly used to modify a new batch.

(d) freeze: Sets intervals, and validates and freezes pending states. Also fills the rescount column in state with the total number of direct resources of the state, and assigns the cycle column of the state table if necessary (see below).

The implementation relies on the well-known Tarjan's algorithm, whose output is summarized in Section 6.1. This is necessary to compute intervals that satisfy:
  i. $x \subseteq y \Rightarrow [b_x, e_x] \supseteq [b_y, e_y]$)
  ii. If x is a controlled resource of y, then $[b_x, e_x] = [b_y, e_y]$.
The steps of the operation are the following:
  i. Construct a graph with vertices all the pending states of the batch, and their direct resources. An edge from x toy is added in two cases:
    A. y is a resource of x.
    B. x is a controlled resource of y. Controlled resources can introduce cycles (see 2.5.3).
  ii. Use Tarjan's algorithm to obtain a list of strongly connected components (SCCs) of the graph, along with edges among them. It is easy to see the edges of the SCC graph correspond to user/relationship edges (1(d) iA above), not controlled resource edges.

The elements of an SCC are either all pending or all frozen.
  iii. For every SCC $C_i$ with pending entries, and edges $[j_1^i, \ldots, j_{1(i)}^1]$ the number of outgoing edges of the SCC $C_i$), do the following:
    A. Compute a comparison list $l_i$, consisting of $C_i$ together with any one vertex from each of $C_{j_k^i}$, $1 \leq k \leq n(i)$. Given the ordering, the endpoints of the edges of $C_i$ have already been processed, hence their elements have identical validity intervals.
    B. Compute $min_i = min_{x \in l_i} e_x$.
    C. Set $e_x = min_i$ for all $x \in C_i$.
    D. Validate all states $x \in C_i$.
    E. Set rescount for all states in $C_i$; for efficiency this can be remembered from Step 1(d)iA above.
    F. Obtain a unique ID for the cycle (e.g. from the RDBMS), and set the cycle column to it for each state in $C_i$.
    G. Freeze all states in $C_i$.
  iv. Delete the batch, and its entries in the counts table.
If controlled resources are not used, the graph is acyclic and enumerating the graph
increasingly suffices; Tarjan's algorithm is not needed.
  (e) Delete batch: Deletes the batch and all its pending states.
  (f) List pending: Returns a list of the pending states of the batch, such that each state appears before any of its users in the list. A sample application is implementing spreadsheet-style "calculate" functionality, to adjust states after changes in resources, such as after the put operation (item 2e below).
  (g) Set intervals: Same steps as Id above, but only do interval setting.
  (h) Validate: Same ordering of states as 1d above, but only do validation.
2. Batch composition: These operations allow choosing which objects appear in the batch and with what model. They all require running update( ) (Section 3.5.1), and thus their output are entries in the for_update table.

With the exception of put, all operations result in exactly one line in for_update, with obvious significance. They can implemented as stored procedures.

(a) new_object: A stored procedure that creates metadata for a new object, containing a unique state valid on [t_at,+∞]. It returns the new object and state ids. The arguments are:
  i. batch: Batch to create new state in.
  ii. kind: Kind of the new state, which already appears in the kind table of the metadata scheme.
  iii. object_name: Name of the object to be created.
  iv. state_name: Name of the state to be created. The default is --.
  v. mark_IN: True to make the new object a generator. Always use True if not consolidating, otherwise the object will disappear immediately, as it is not yet in use (see 2.4).
Creating the state itself is the responsibility of the application code (Section 5.2.1).
  (b) duplicate: Duplicates a state in the batch (i.e. a resolution), as the unique state of a new object, as a generator.
  (c) clone_frozen: Clones the frozen state, and replaces the object's model with the clone. As frozen states cannot be changed, a copy is needed to make modifications.
  (d) reload: Available if the state was created by duplicate or clone_frozen. Using the original column of the counts table, another copy is created and used as a model.
  (e) put: Adds or replaces a model, adding or adjusting resources as necessary. Its arguments are:
    i. toAdd: State to be added as a model.
    ii. generator: True/False. Specifies toAdd's object generator status.
    iii. replace: True/False. If True and toAdd's object is already in the batch, replace the current model with toAdd.
    iv. putFlag: Can have 3 predefined values:
EXACT Fail if there exists a model conflict, i.e. if the object of a resource of toAdd is already in the batch with a different model.
FORCE If there is a conflict between the resources of toAdd and existing models, replace the models with the resources of toAdd.
ADAPT If there is a conflict between the resources of toAdd and existing models in the batch, use the existing models.

The above options can be combined to "mix-and-match" existing states. The result is not guaranteed to be correct; further changes can be made either manually or using application logic.

The implementation uses a queuing algorithm to process toAdd and its resources top-down. As the user/resource graph is acyclic, the set of resources can be listed such that every user appears before any of its resources. The stopping condition is determined by putFlag.

Processing the queue gives a set of models to be added to the batch's description, each resulting in a line in for_update. toAdd will have a non-zero entry in the delta_g column, determined by the generator flag.

(f) delete: Remove pending state to_delete from all its users, and delete it. The potentially cascading effect on users is determined by the on_delete flags of the dependencies involved (Section 3.3). As frozen states have frozen resources, only pending states are affected.

The first step is to construct a graph of users, with edges between users and resources. The graph's edges store the dependencies relating the two states, taking into account that a state can be a resource of another in more than one way, either because of multiple dependencies among kinds, or because of multiple occurrences within the same dependency.

A vertex is marked DELETE if it has a resource in the graph already marked DELETE, and the dependency's flag is cascade, and marked KEEP otherwise. If marked DELETE, the vertex' users are added to the graph.

A vertex' status can be changed from KEEP to DELETE, if it is reached again by via a cascade dependency. For clarity, if x is a resource of y via two dependencies that have restrict and cascade flags, deleting x succeeds; cascade takes precedence.

Once the graph is complete, the vertices are iterated over with users occurring before resources (possible as the graph is acyclic). Each vertex is processed according to how it is marked:

KEEP: All incoming edges come from expanded vertices, and only DELETE vertices are expanded, therefore no cascade incoming edges are possible. There are now two possibilities:

(FAIL) At least one incoming edge contains a restrict dependency. To_delete cannot be deleted due to restrict dependencies.

(ADJUST) All incoming edges contain only setNull or delete dependencies. The user/resource relationships are eliminated by changing the dependencies' tables, and the incoming edges are deleted from the graph.

This step leads adds the requirement that the data allows this changes (Section 2.6, item I(b)iii).

DELETE: As users are processed first, the vertex has no outgoing edges (no users), insured by the (ADJUST) case above. The state's object is added to the for_update table, with −1 in the delta_g column. All incoming edges, and the vertex itself, are deleted from the graph.

The algorithm finishes when all vertices have been processed.

The delete operation can be implemented as a store procedure, with the usual caveat of complexity.

(g) mark_IN: Force the object to appear in the batch. The object will remain in the batch even if it is not a resource of another state.

(h) mark_AUTO: The object will be dropped from the batch unless it is an (in)direct resource of a generator object.

(i) pin: Lock the current state as the model for its object within the batch.

(j) unpin: Unlock pinned model.

3. State editing: These operations directly modify the counts table, and do not require batch updating. They take the state and user accounts as arguments.

(a) reserve: A state can be reserved for edit by an individual user.

(b) release: Release a reserved state.

(c) touch: Will fail unless the user has the state reserved. Changes the state's timestamp, facilitating implementing a state cache.

SQL-style read/write locks can be implemented, but require deadlock detection. All three can be implemented as stored procedures.

4. Evolving states:

(a) make_head: Set the parent of the resolution to NULL.

(b) make_descendant: Set the parent of the resolution to crossleft (see 3.5.3). Reverses operation 4a.

(c) advance: Given a tangent state toAdvance, it creates a new state in the batch with toAdvance as parent. The steps are:

i. Check toAdvance satisfies the required conditions for advancement (see Section 2.5).

ii. Call next( ) (see Section 5.2.2).

iii. Set the crossleft of the newly created descendant to toAdvance (see Section 3.5.3).

While advance cannot be a stored procedure, as next( ) is implemented in a high-level language, it is possible for Step 4(c)i, the more complex part.

(d) merge: Implements the merge-advance functionality described in Section 2.5.1. The logic is the same as for advance, with the additional argument mergeSoure passed to next( ).

4.3 Frozen State Operations

As frozen states to not change, the operations consist of generation of descendant states and maintenance.

1. Up-keeping:

(a) rename_object: As QEI uses only object IDs, this concerns human interaction only.

(b) rename_state: Optionally renames resources and descendants, to maintain consistent branch naming, e.g "main" or "production". Recall state names represent versions (Section 3.2 item 4).

2. Automated state construction: Automatic advance and merge are done via the natural descendant mechanism (see Section 2.5.2).

(a) make_natural Set as the parent's natural descendant. Changes the naturaldesc_state column of the state table; the prior value is NULL.

(b) cancel_natural: Sets naturaldesc_state to NULL.

(c) natural_advance: Applies to a state x that does not have a natural descendant. The steps are:

i. Create a graph of (in)direct resources of x. For each added resource, do not look further if it extends beyond $e_x$, or it has a natural descendant. This shortens the calculation, and allows natural sequence to use non-natural resources, in effect present itself as a "black-box". For an example, see Section 2.5.2. Sort the graph resources first to produce a list R of states.

ii. Create two empty lists U and A. U consists resource continuations, and A of states to be advanced.

iii. Iterate over R. For every y∈R, one of the following will hold:

A. $e_y > e_x$ y is added to U, as it is valid past the advancement point $e_x$.

B. $e_y = e_x$ and y has a natural descendant n(y). n(y) is added to U.

C. $e_y = e_x$ and y does not have a natural descendant. y is added to A.

iv. Create a batch B at ex containing U as initial elements. This checks the entries of U are compatible.

v. Iterate over y∈A by advancing y into B (Section 4.2 item 4c), collecting the result into a list of new descendants N.

vi. Freeze B. If validation fails, the batch can be manually changed.

vii. Mark all the entries of N as natural descendants (item 2a above).

viii. Return the last entry of N, the natural descendant of x.

As an observation, controlled resources allow next( ) to modify pending resources. This does not affect natural_advance, but affects future amendments (see 2.5.3).

(d) natural_merge: Also constructs a natural descendant to a state x, but takes an additional argument m as a merge source (see 2.5.1 and 5.2.2). m is a part of the same object as x. If $e_m<e_x$, the natural descendants of m are followed until an m' is found with $e_m'>e_x$; if the natural descendants are exhausted without finding m', the operation fails.

The algorithm is the same as above, with the difference that in Step 2(c)v, a merge source is provided to the batch function merge. For a given y, the merge source $m_y$ is the unique (in)direct resource of m (or m') in y's object. If one does not exist, the special value NOT_FOUND is used (see also 5.2.2).

natural_advance and natural_merge can be iterated using the return value to advance multiple periods.

3. Trimming the database: While frozen states cannot be changed, they can be permanently discarded:
  (a) kill: Permanently discard a state, including all its descendants and users. It is a very drastic operation.
  (b) detach: Prior to using kill operation above, a parent can be detached to limit the effect of kill. It is irreversible.

5. Requirements for Application Data

1. Database representation: Application data is stored in database schema, which link to the metadata schema. The restrictions are discussed in Section 5.1.
2. Low-level functionality: Every kind implements delete and duplicate as stored procedures (Section 5.1.3).
3. Hooks: These are high-level programming language calls that are provided to QEI to support the process of creating states. They are:
  (a) validate( ) Returns a boolean value, using only information about the state, its resources, and its parent. It is called during freeze (see Section 4.2 item 1d), or manually, and it is guaranteed resources have been validated already. It is a const method; update( ) is not run during freeze( ).
  (b) next( ) Provides evolution and patching logic (see below 5.2.2). It is related to application logic, as the same rules apply inside next( ) as for non-const methods.
  (c) controlled( ). Returns the controlled resources of the state, which should be pending when next is run. It is a const method. See 2.5.3 and below 5.2.2.
4. Constraints on application logic: Kind-specific logic, including constructors, is implemented in a high-level programming language, for which a QEI Development framework has been provided. The limitations are discussed in Section 5.2.

5.1 Schema Requirements

For a specific programming language, kinds correspond to application classes. Application class data can reside in multiple tables, but every kind has a unique main table whose lines are in 1-1 correspondence with the states of that kind. The name of this preferred table is stored in the main_table column of the kind table in the metadata schema. In this main table, the primary key is a column named id of type UNSIGNED BIGINT(20); ids are supplied by the framework (see 5.2.1 below).

Duplication (5.1.3 below) has some consequences for UNIQUE indices. This is a basic choice: if versions of states are needed, UNIQUE indices are analyzed early on.

5.1.1 Dependencies

User/resource relationship among states are modeled by dependencies, stored in the meta-data schema table dependency (Section 3.3). Entries should be added into dependency table via SQL, either manually or automated. The graph of dependencies among kinds can have cycles.

The dependency's table in the application schema is assumed to fully describe the relationship, and replacing all occurrences of a resource should be allowed, and amount to replacing the resource. This is a core requirement by the batch update mechanism (see 2.4 and 3.5.1). The resulting object can be invalid, and this will be caught by validation, run when the batch is frozen, or manually. Tables with dependencies may not have triggers, as they are generated automatically to monitor resource changes.

5.1.2 Inheritance

Inheritance is a fundamental relationship among kinds, stored in the inheritance table. Bases are considered resources of the derived class; in particular if a batch contains a kind, it will also contain all its bases. (recall kinds are states). Multiple inheritance is possible but always virtual. This fits the Python model, but cannot represent C++-style non-virtual multiple inheritance. If the data should be accessed from Java, multiple inheritance should not be used.

The hierarchy of main tables mirrors the kind hierarchy. Entries in the main tables of kind bases share the id of the most derived instance, and as result they are not homogeneous by kind.

The following two rules are followed:
  1. All the bases that are QEI application classes appear in the inheritance table, not just direct ones. A line appears for the class itself, i.e. (classId, classId).
  2. The id column should have foreign keys on all direct kind bases.

5.1.3 Low-Level Functionality

QEI requires the following to be implemented as stored procedures:
  1. delete: Deletes a state, but not its resources. Needed by the batch updates (see 2.4 and 3.5.1).
  2. duplicate: Creates a clone of the state. Needed by the batch updates, and the batch operations open_frozen, duplicate and duplicate_batch (Section 4.2).

Separating delete and duplicate because of hooks is due to the complexity of updating batches This allows batch updating (see 3.5.1) to reside in the database server, and be used by all programming languages; the efficiency gains are substantial. They also tend to be boilerplate, therefore a framework can automatically generate them in a majority of cases. An additional benefit is that zone subscription becomes automatic.

5.2 Application Logic

Application logic that constructs or modifies pending states uses batches; batches cannot be mixed (see 2.4). Therefore, such methods should receive the batch, database connection and user account among their arguments. const methods, such as the hooks validate( ) and controlled( ) below, should not make modifications, even if they have enough information to do so.

Such methods should accept the batch, database connection and user account as arguments, along with other information needed.

The programmer should be cognizant of the need to update batches after resources change. Committing the connection requires resource_change and for_update to be empty. As batch updates are time consuming, consolidation is possible (see 3.6.1).

To change any state, it should be pending and reserved for edit by the correct user account. This can be checked using touch, which should also be run whenever a change is done that does not change the state's entry in the kind's main table. These are gentlemen's agreements, with no enforcement mechanism; a framework can provide a more rigorous interface for a specific programming language. In general, assigned resources should be resolutions of the batch. In consolidation mode (see 3.6.1) that is not always possible, e.g. when assigning a state of a newly created object. Assigning non-resolutions is prohibited by default, and enforced by triggers.

5.2.1 Creating New States

Object construction is treated differently form state duplication, as it typically requires information that is only available in a high-level programming language. Creating a new object is a two step process:
1. Create metadata: Call the new object stored procedure (Section 4.2 item 2a, which returns the new object and state ids.
2. Create application-specific data: This is part of the application logic. At a minimum, the new state should appear in the kind's main table.

A development framework can simplify the task by providing factory-like functionality.

5.2.2 the Next( ) Method

The advancement mechanism (Sections 2.5 and 2.5.1) requires each kind to provide a next( ) method, which models behavior at the end of the validity interval. Normal maintenance of data should be captured here, including manual inputs. next( ) does not need to be deterministic.

The arguments for advancement at time t are:
1. parent: A frozen state with x with $e_x=t$.
2. batch: A batch at time t.
3. continuations: The descendants of resources of x in the batch; if a resource of x is valid at t, it will itself be used. The special value END can be received, to signify the logical end of a resource's object (e.g. a bond maturing). The proper way to handle it is part of the application logic.
4. mergeSource: The possible values are:
    (a) None: next( ) was called by advance.
    (b) A state in x's object valid at t, or END: next( ) was called by merge, or by natural_merge and source was found.
    (c) The special value NOT_FOUND: natural_merge did not find a merge source (see Section 4.3 item 2d).
mergeSource should be used as a source of previous manual inputs, or any other information not found in either the parent or the continuations. This functionality should be designed based on the need for amendments (see 2.5.1).
5. conn: A connection to the database; should not be committed during next( ).
6. user: A user account so that next( ) can modify states (see reserve and release, Section 4.2 item 3).

The return should be the descendant, as a resolution in the batch, or the special value END. If it is impossible to construct a state correctly, there are two options:
1. Fail. Will require the user to retry, perhaps with different resources.
2. Returns a state that fails validate( ). Freezing the batch will fail, but a pending state will persist, which can be changed manually.

Next can use of controlled resources. These are resources that should be pending when next( ) is run (see 2.5.3). Using controlled resources in next( ) should be coordinated with controlled( ). If consolidating (Section 3.6.1), update( ) should be run.

5.2.3 Conceptual Considerations

Underlying the QEI approach is the assumption that the user/resource graph is acyclic. This needs to be considered early on in the design, when determining what should be QEI states. The general rule of thumb is that if a subcomponent of some data can function on its own, and can be potentially used in more than one place, it should be a state. The smaller states are, the more likely cycles are to appear.

Another consideration are the limitations on concurrency discussed in Section 3.6. The issues raised are not new, as it primarily concerns long operations that use numerous resources, hence raising the risks of waits and deadlocks. One question application design needs to answer is the role of batches. Batches are necessary when several users need to cooperate on data that has not been frozen yet, which should not be too common in the operation of large systems. Except within an individual batch, no concurrency issues arise, as different batches only share frozen states.

6. Example Algorithms 6.1 the Output of Tarjan's Algorithm

For a directed graph $(X,E), E \subseteq X \times X$, a strongly connected component is a subset $C \subseteq X$ such that for all $x,y \in C$, y is reachable from x. Let the set of SCCs of X be denoted by $\bar{X}$. Each $x \in X$ belongs to exactly one SCC. With $\bar{E} \subseteq \bar{X} \times \bar{X} = \{(C,C')|(C \times C') \cap E \neq \emptyset\}$, $(\bar{X}, \bar{E})$ is an acyclic graph.

Tarjan's algorithm takes a list of pairs (vertex,[endpoints]) computes a list of SCCs, each a list of vertices, together with the list of outgoing $\bar{E}$-edges, as indices in the result list.

For example, from $[(1,[2]),(2,[1]),(3,[4]),(4,[1,3])]$ representing $X=\{1,2,3,4\}$, $E=\{(1,2), (2,1), (3,4), (4,3), (4,1)\}$, the result of the Tarjan's algorithm is $[([1,2], [ ]), ([3,4], [1])]$, i.e. $\bar{X}=\{\{1,2\}, \{3,4\}\}$. $\bar{E}=\{(\{3,4\},\{1,2\})\}$. It is guaranteed that if $(C,C') \in \bar{E}$, C' appears before C in the result.

Managing Atemporal Hierarchical Data

The present document also presents techniques for managing data items which are linked by user/resource relationships. In some embodiments, the conflicts may be managed by grouping data items into objects, defined to be sets of mutually exclusive data items. The data items of an object are called states. An intuitive representation is that in any realistic situation, only one state of an object can be true.

The notion of batch, a complete and conflict-free set of data items, is introduced. A way of constructing batches out of conflicting items is described, based on batch descriptions consisting of generator objects and model states.

An non-commutative monoid action on the set of batch descriptions is defined, which captures a set of operations sufficient to manage batches in practice. For the acyclic case, an algorithm for recomputing a batch after changes induced by the action is given, making large batches practical. Associativity allows operations to be consolidated prior to recalculation.

7. Batch Editing 7.1 Introduction

Data items can be related in many ways. Groups defined by subsets, shared characteristics, and proximity according to metrics are just a few. Hierarchical data may refer to sets of items related by binary relationships between users and resources, modeled as a directed graph with items as vertices, and arrows going from resources to users. The assumption is that a user's functionality depends on its resources; conversely, a resource can be used by many items, but its own functioning does not depend on being used.

Some embodiments may manage dynamic hierarchical data, and provide tools for a modular approach to data. For data of any kind, beyond a certain level of complexity the importance of keeping track of versions is well established, and hierarchical data is no different. This documents presents various approaches, collectively called batch editing, for modifying and combining hierarchical data items, while keeping track of versions.

When working with versions of objects, such as code files or industrial designs, their use can be broken down into two categories. The first, which is referred to as primary functionality, requires choosing one version for each object. For example, a building ultimately has one design, as does a software application. The second is historical functionality, in which different versions are related. An item's history may be time-driven, or simply abstract, such as a document's versions. Batch editing is concerned with primary functionality. Thus it is applicable to objects without history, or once a point in history is fixed.

Terminology-wise, an object's versions are referred to as its states; for primary functionality, in any realistic context only one state of the object can be correct. Embodiments may distinguish between immutable and mutable states. A familiar example are files checked into a version control system being immutable, with working copies mutable. All the (in)direct resources of an immutable state may be assumed to be immutable; as the behavior of a state depends on that of its resources, it cannot be otherwise guaranteed deterministic.

Figure 2A:
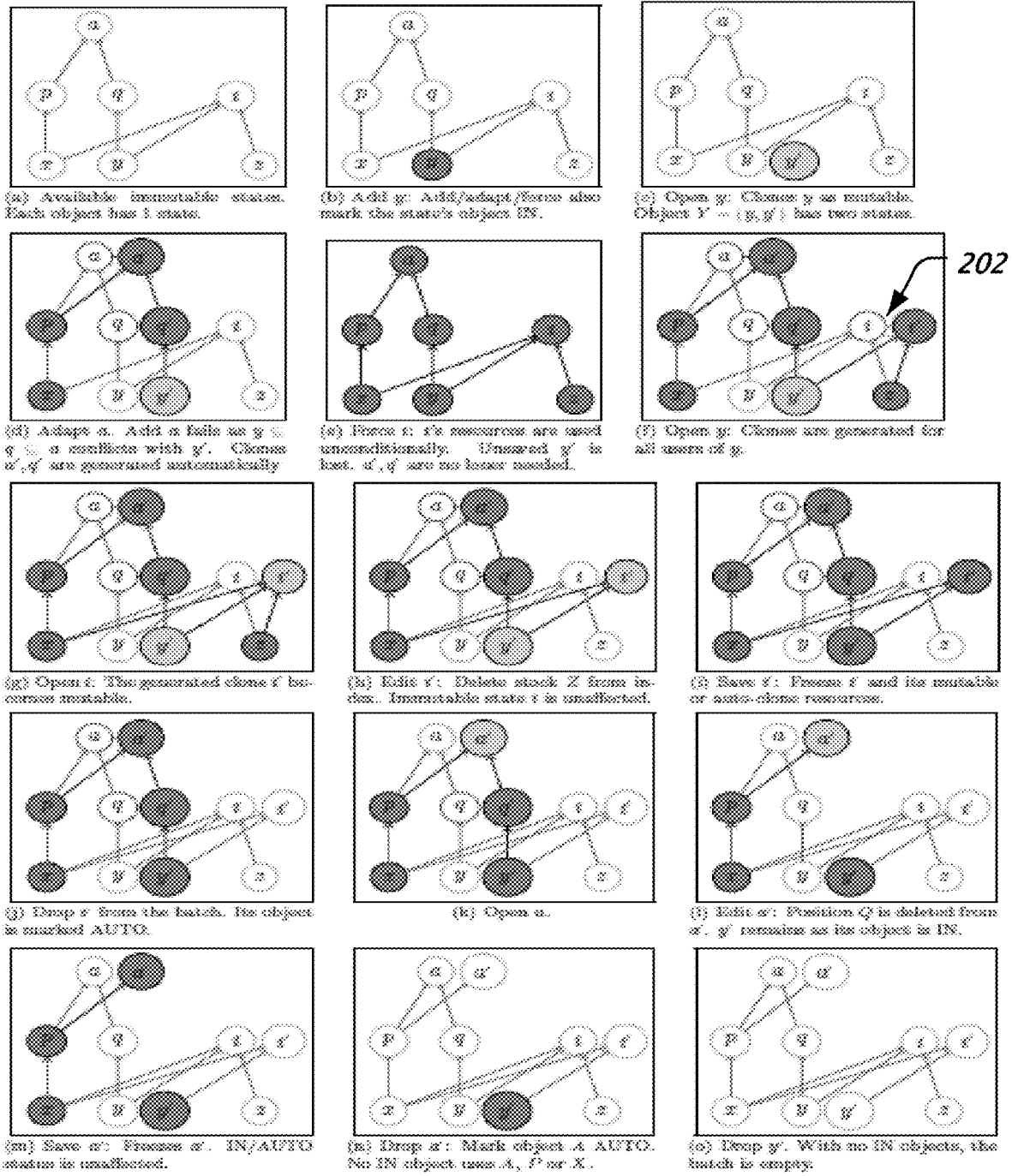
FIG. 2A is a depiction of an example of an evolution of a batch.

Here are a few examples of hierarchical data:
1. Design components, such as AutoCAD files. Components are nested, and often make sense in isolation. Only one version of a component can appear in the final version.
2. Software installed on a computer. An application may require plug-ins, libraries, other software, or specific operating system versions. Software in general is multi-purpose, naturally fitting user/resource relationships. In many cases only one version can be installed, and other items, e.g environment variables, can only have one value.
3. Financial information tends to be tiered. A portfolio is composed of positions, which in turn rely on information about securities, such as stocks, options etc. A stock option has the stock itself as a resource, but not the other way. FIG. 2A depicts a toy example.

An important issue with respect to hierarchical data is whether to allow cycles in the user/resource graph or not. All items in a cycle are both users and resources to each other, which is not intuitive. However, any directed graph can be reduced to an acyclic one by regarding each maximal cycle as a node; if most of the complexity is retained, user/resource concepts are relevant. The issue is continuum rather than a binary choice.

While the batch editing make senses in general (Propositions 7, 8 and 9), efficient computations are difficulties when cycles are present; the incremental algorithms of Section 9 may not work. Together with other rationales, such as data modularity and validation, acyclic relationships may be the better paradigm if keeping track of versions is a concern. Many practical examples, including the ones mentioned above, are indeed naturally acyclic. Section 7.3.2 further discloses such examples.

7.2 Batch Operations

When relationships are present, it does not make sense to edit states in isolation. Implementations may consider which users will be affected, and perhaps adjust resources. The cornerstone of the approach is the concept of batch, defined as set of states that is both complete and consistent. Completeness means that if a state is in the batch, then all its resources are as well. Consistency means that no object can have multiple states within a batch, eliminating "out of sync" issues. Any mutable state belongs to a unique batch, and thus editing is constrained to batches.

Any set of batch operations must include adding and deleting states. However, working with relationships complicates matters. An added state is accompanied by resources, which may conflict with existing states. Deleting is not straightforward either, as used states cannot be removed. Even immediately reverting an add operation raises issues.

The reader is familiar with these difficulties. When installing software, it is easy to prompt the user to install or upgrade components, but no checks are made for conflicts with existing software. Uninstalling does not revert these side-effects, as it is not known what actions have been done since, and downgrading is often not supported. Human intervention is required, and problems often occur.

To address these concerns, implementations may construct batches out of two types of data (Definition 3 and Proposition 7):
1. Which objects should appear in the batch. Objects that must appear in the batch are marked IN, the rest AUTO; the latter are added or deleted as needed. Conceptually, installed software would be an IN object, with required software AUTO.
2. Which state of an object should appear in the batch. These may be called models.

An advantage is that IN/AUTO designations and model replacements are generally reversible.

Here is a possible set of batch operations:
1. There are three flavors of adding a state x to a batch:
   (a) add: Proceed if there are no conflicts between the resources of x and current batch states.
   (b) adapt: If there are conflicts, modify x. Existing states are not changed.
   (c) force: If there are conflicts, use the resources of x. x will become a model as is.
   All mark x's object IN.
2. Edit operations:
   (a) open: "Opens" an immutable state for edit. As immutable states cannot be modified, a clone is created.
   (b) save: Freezes a mutable state, along with any mutable resources. Recall resources of immutable states are immutable.
3. IN/AUTO designation:
   (a) IN: Mark object IN. Kept in the batch regardless whether in use or not.
   (b) AUTO: Mark object AUTO. When the object is no longer in use (perhaps immediately), remove it from the batch, together with resources not used otherwise. It is easy to see how an add operation, coupled with AUTO provides a better model for install/uninstall.
   (c) drop: Only available if a state is not in use; it is simply a rename of AUTO.
4. A model lock. The force command destroys mutable states that conflict with the new state. To prevent accidental loss, models can be locked against replacement:
   (a) pin: Locks in the current model. A conflicting force will fail. This is done automatically by open.
   (b) unpin: Removes the lock. save unpins all the states it freezes, as they can no longer be lost.
   Both commands can be done manually too.

To see these commands work, refer to FIG. 2A. The example has 7 objects, each with one state. Object A represents an account with two stock positions P,Q on stocks X,Y the stock index I contains stocks X,Y,Z. The initial relationships can be seen graphically in Diagram (a). The progression is:

1. Diagram (b): Addy. No conflicts with an empty batch.
2. Diagram (c): Open y. As y is frozen, a mutable clone is created, and becomes Y's model.
3. Diagram (c): Add a. Fails as y is an indirect resource of a, and conflicts with y'.
4. Diagram (d): Adapt a. This step is an example of how resource conflicts are
resolved. No batch can contain both a and y'; completeness requires y, which conflicts with y'. Copies a', q' of a, q, are created, with q' a resource of a', and y' a resource of q'. a' and q' are not mutable, and a,q are still models for A,Q. Refer to a',c' auto-clones, which the diagrams show in blue, with their models circled in red (e.g., 202). For clarity, it is the auto-clone that belongs to the batch, not its model.

Not being mutable, auto-clones contain no information; if no longer needed, they are discarded automatically. Application logic can produce different results, as their resources are different. A related situation is attempting to change the version of the required components for some software; it may or may not work.

5. Diagram (d): Force i. This fails, as Step 2 pinned y' as Y's model.
6. Diagram (d): Unpin y'.
7. Diagram (e): Force i. y' is replaced with y as a model. y' is now a mutable state without a batch, and is discarded, hence the need for pin/unpin.
8. Diagram (f): Open y again. The users of y must be switched to y', therefore clones are generated for a,q,i; they remain models and are shown again in red.
9. Diagram (g): Open i.
10. Diagram (h): Modify the stock index ii to no longer include stock Z. Z is AUTO, and is dropped.
11. Diagram (i): Save i'. This freezes i' and its mutable or auto-clone resources, in this case y'.
12. Diagram (j): Drop i'. As i' is not in use, the drop operation is available.
13. Diagram (k): Open a. The generated state a' is set as the model for A. Though initially the same, a no longer plays a role in the batch.
14. Diagram (l): Modify account a by deleting the position Q. Q is no longer in use, and was never marked IN, hence is deleted. y' behaves differently, as the add operation at Step 1 marked Y IN.
15. Diagram (m): Save a'. a becomes immutable.
16. Diagram (n): Dropping or marking A AUTO are equivalent, as there are no users of A.
17. Diagram (o): Drop Y.

Notice the last two steps are performed on the object, not the state. The IN/AUTO designation is per-object, not state; otherwise model replacement does not work.

Implementation-wise, the above operations can be expressed in terms of three elementary operations:
1. Replace models.
2. Change IN/AUTO flags.
3. Change pin flags.

Adding operations compute a set of models to replace, different by flavor (see Proposition 9), and combine it with a object IN designation. open consists of creating a copy state, a model replacement, and setting one pin flag. The sole effect of IN, AUTO, drop, pin and unpin is changing one flag. Finally, save changes the pins of states it freezes.

The implementation of the elementary operations (without the pin flag) is discussed in Section 8.2, in terms of monoid actions. For the reader not familiar with modern algebra, the practical consequence is that operations can be consolidated, allowing bulk processing of batch updates.

7.3 Requirements on Data

Requirements can be divided into data manipulation needed by the batch mechanics, and the more conceptual requirement that user/relationship graph does not have cycles.

7.3.1 Data Manipulation

As it can be seen from the above steps, for the approach to work the data must provide the following:
1. A way to copy states. Needed both for open and auto-clones.
2. A way to delete states. Needed when mutable states become obsolete (Step 7 above), and for discarding auto-clones.
3. Resource replacement. Both mutable and auto-clones must be adjusted when the batch changes. The data must allow this operation, or provide adequate functionality.
4. Monitoring resources. For batches to update after edits, such as Steps 10 and 14, changes must be picked up by the batch.

If a database is used, it is preferable that these operations are implemented as stored procedures. This allows the batch functionality to reside in the database server, and therefore be available in any programming language.

As the algorithms are a bit complex, implementing them in SQL is not easy. However, most database management systems allow high level language code to reside on the server, e.g. MySQL's C++ user-defined functions, and Oracle's Java stored procedures.

FIG. 2A: The evolution of a batch. At every step, the batch consists of the filled-in states; empty circles represent available states.

7.3.2 Representing Data with Acyclic Relationships

Besides using the algorithms in Section 9, there are a number of benefits to working with acyclic graphs:
1. An acyclic directed graph can be enumerated with each resource coming before its users. This has many uses, including automatic validation of data.
2. Identifying and analyzing cycles is good programming practice, as validation highlights. Recall any directed graph can be reduced to an acyclic graph, with cyclical components as vertices, e.g. by Tarjan's algorithm.
3. Modularity of data is difficult with cycles. The very concept rests on the assumption the user is not a resource itself, otherwise it is impossible for the resource to be used anywhere without the user present.
4. Having separate versions for the states of a cycle is of limited use, as reconciling mutually needed components is difficult; most likely the versions would be linked Nonetheless, data modeling concepts include bidirectional relationships, and they suit many applications. There is no contradiction; our view is that if keeping versions is important, resolving cycles is useful. In many cases it can be done.

Consider the example a transfer t from account x to account y. Each account needs to know the transactions booked for it, and its balance cannot be validated without knowing all relevant transactions. On the other hand t cannot be specified (and validated) without knowing its "from" and "to" accounts, and the user interface might require navigating from t to x and y. It appears bi-directional relationships are needed.

Applying 2) above to treat cycles as one state does not work. Given interconnections between accounts and transactions, the result is one state comprising all accounts and all transactions. The solution lies in better understanding the data, and finding an acyclic representation.

The first observation is that a transfer does not need to know everything about an account, such as other payments, as the routing information suffices. Two states $i_y, i_{y'}$ representing the routing information, can be assigned as resources to x and y. t can use $i_x, i_y$, and in turn be used by x,y, eliminating cycles.

The requirement to navigate from t to x and y is more difficult, since making x a resource of $i_x$ would create cycles. The problem has a conceptual component. Suppose there exists another version x' in the X object of x, which also sees t as a transaction. Should the screen for t link to x or x'?

The solution combines a few observations:
1. The visualization likely exists in a realistic context, e.g. the "current system" s, itself a state. As such at most one of x or x' can be a resource of s, and that is the correct account to find.
2. While $i_x$ cannot know x, the acyclic assumption is not violated if $i_x$ knows X. This can be thought of as a dynamic pointer towards X to be resolved within a batch.
3. The visualization can obtain X from $i_x$, and x as the unique state of X in s. The key here is that the visualization navigates from $i_x$ to x, not $i_x$. The visualization is itself a state with s as a resource.

This analysis is relevant to other cases. A very similar one is IMDb, with apparent bidirectional relationship between actors and movies. A more complex one is how cash-flows and new trades are consolidated with existing positions in a trading book. While a discussion is beyond the scope here, it is worth mentioning the above ideas work.

7.4 Batch Representation

Computing a batch from models and IN objects requires two tasks:
1. Determining which objects belong to the batch.
2. Computing which states need auto-clones.

While a direct computation is easy, (Propositions 4 and 8), in practice it is important to be able to update a batch after small changes efficiently, otherwise the approach is not practical. Section 9 provides algorithms for the acyclic case.

It turns out both tasks can be represented by numerical counts. For an object X, define $\mu(X)$ by counting +1 if X is marked IN, and +1 for every user Y of X (according to Y's model). Clearly X appears in the batch if and only if $\mu(X)>0$.

Similarly, a state x does not require an auto-clone if it is a model, and all its resources, direct or indirect, are also models. Define the $\rho(x)$ by counting +1 if x is a model, and +1 for every resource that is known NOT to require an auto-clone. An auto-clone is needed when $\rho(x)<1+n(x)$, where $n(x)$ is the number of resources of x. If a mutable state needs an auto-clone, the state itself is modified.

Using $\mu$ and $\rho$, a batch is stored as a set of entries, one for each object represented in the batch, each entry consisting of:
1. The IN/AUTO flag.
2. The model.
3. The batch state. It is the auto-clone if the object has one, or the model otherwise.
4. $\mu$. All values are positive; 0 causes the object to be dropped.
5. $\rho$. All values are $0 < \rho(x) \leq 1+n(x)$.
6. The pin flag.
7. Mutable flag, True when the model is mutable.

Figure 2B:
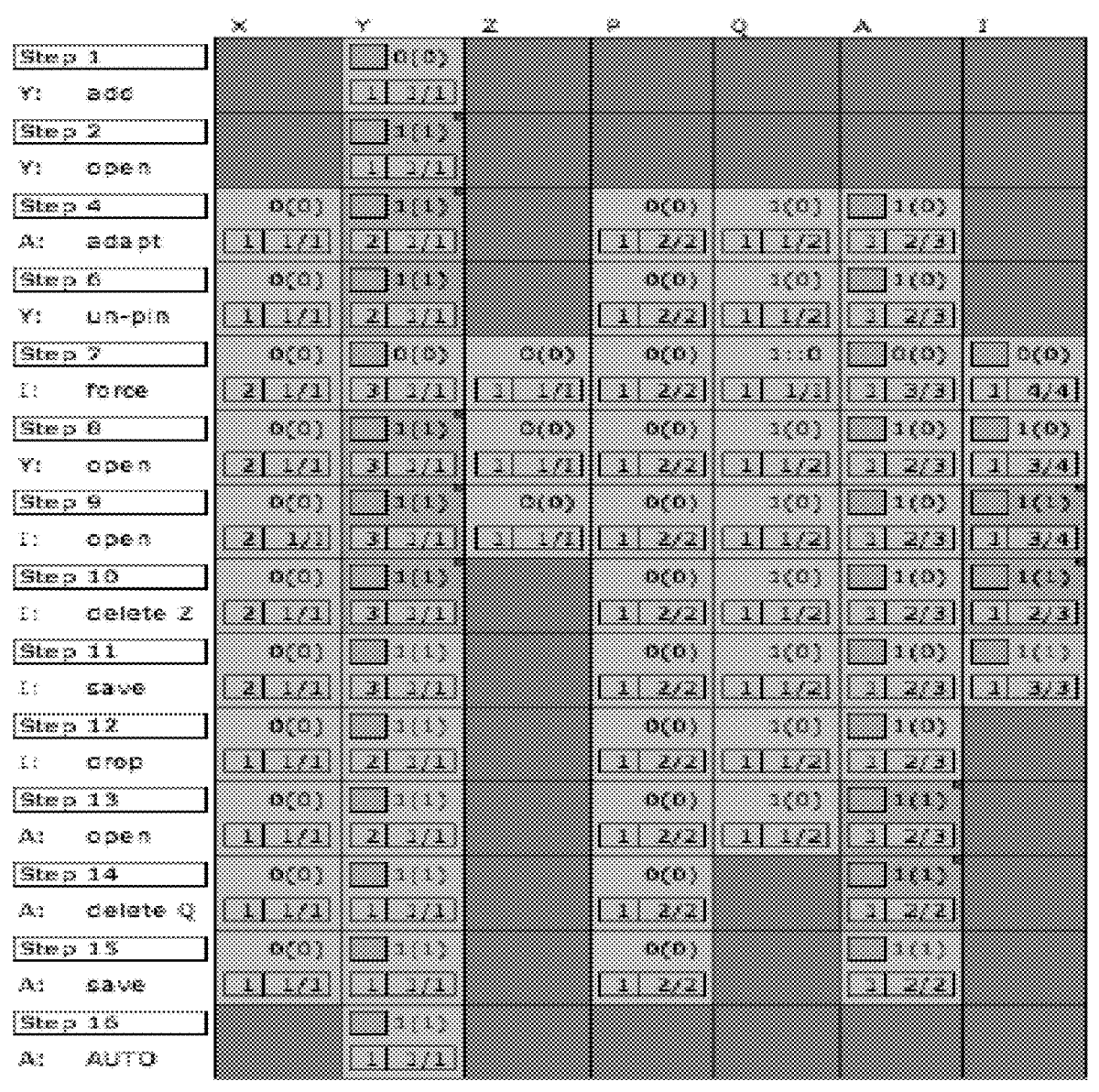

$\mu$ and $\rho$ can be easily computed by hand on small cases; FIG. 2B contains the values corresponding to the diagrams, along with a complete batch description:

1. The color of the state represents the three possible cases: gray for immutable, lime for mutable, and blue for auto-clone.
2. An orange box in the upper left corner means the object is marked IN.
3. A small red upper-right corner means the model is pinned.
4. The top line is "state(model)", with 1 for the newer state. Object Q line 3 has 1(0), meaning q' is the batch state and q is the model. The two are equal except for auto-clones. The red font (e.g. Y Step 11) denotes a new frozen state.
5. The lower left single number is $\mu$. E.g for column Y Step 7, the number 3 corresponds to Y being IN, and having two users, I and Q.
6. The lower right pair of numbers is $\rho(x)/(1+n(x))$. The same Q box on line 3 has ½, meaning $\rho(q)=1$ and $n(q)=1$ (q has a single resource y). $\rho(q)=1$ as it is a model (+1), but its resource y is not. With 1<2, q' is an auto-clone.

A reader looking to understand the update algorithm could apply it to some of the more interesting steps, e.g. 7, 8 and 14.

8. Hierarchical Repositories

Some implementations that can support the functionality described in Section 7 are described.

8.1 Repositories and Batches

Fix two sets $\Omega$ and D.

Definition 1 For a triple $(S, \pi: S \to \Omega, v: D \subseteq S \times D \to S)$, define $D(x)=\{d \in D | (x,d) \in D\}$, $v_x = v(x, -)$, and $R(x)=\{y \in S | \exists (x=x_0, \ldots, x_n=y), x_i \in Im(v_{x_{i-1}})\}$.

1. A set $A \subseteq S$ is called realistic if $\pi$ is 1-1 on $R[A] = \cup_{x \in A} R(x)$.
2. $(S, \pi, v)$ will be called an $\Omega$-repository if for every $x \in S$, $\{x\}$ is realistic.
3 For S, S' two $\Omega$-repositories, $Hom_\Omega(S, S')$ will consist of the functions $f: S \to S'$ such that:
   (a) $\pi' \circ f = \pi$.
   (b) $v_{f(x)} = f \circ v_x$.
4. $S' \subseteq S$ is a sub-repository if $R[S']=S'$. and we write $S'<S$. In this case. inclusion is a morphism.
5. A realistic sub-repository will be called a batch.
6. We denote $|v|(x,y)=|\{d \in D(y) | v(y,d)=x\}|$, $DG[v]=(S, \{|v|>0\})$ regarded as a directed graph.

The elements of $\Omega$ will be called objects, and those of S states. Every state belongs to the unique object $\pi(x)$, denoted I IM(v x̄ ire the resources of x, indexed by entries in D, the set of resource descriptions. $u(x)=\{y \in S | |v|(x,y)>0\}$ will be the set of users of x.

Batches represent sets of objects with compatible dependencies. Consider constructing a batch from a set of states $A \subseteq S$ with $\pi|_A$ is 1-1. For A not realistic, there is no batch $A \subseteq B \subseteq S$, but batches can be constructed in extensions $S<S'$.

In practice this amounts to reconciling object resources by editing. States, as mathematical constructs, are immutable, and the edit of a state is simply another state; whether a state in S'-S shares a physical memory location with one in S is not a concern here.

Proposition 2 Let $f_i: S_i \to S$, $i \in I$ such that:
1. $\cup_{i \in I} Im(f_i) = S$.
2. $f_j^{-1} \circ f_i: f_i^{-1}(Im(f_j)) \to f_j^{-1}(Im(f_i))$ is an isamoiphism of sub-repositories for all $i,j \in I$.

Then S has a unique $\Omega$-repository structure such that each $Im(f_i)$ is a sub-repository of S, and $f_i: S_i \to Im(f_i)$ is an isomorphism.

Proof: This is a straightforward verification that $\pi, v$ are well defined. □

Definition 3 Let m: $M \subseteq \Omega \to S$:
1. m will be called a model set if $\pi \circ m = 1_M$.
2. A model set will be called a batch model if additionally $\pi(\text{Im}(v_{m(\omega)})) \subseteq M$ for all $\omega \in M$. In that case $(M, 1_M, v^m)$, $v^m(\omega) = \pi \circ v_x(m(\omega))$ is a repository.
3. For $G \subseteq \Omega$ a model set will be called G-complete if $G \subseteq M$ and there exists $G \subseteq N \subseteq M$ such that $m|_N$ is a batch model.

Proposition 4 Let $G \subseteq \Omega$ and m a G-complete model set. Then $R_N[G] \subseteq N$ is independent of N. We denote the common value $R^m[G]$, and $m_G = m|_{R^m[G]}$.

Proof: Let $G \subseteq N, N'$ two batch models, and $\omega \in R_N[G]$. By the definition of $R[-]$, there exists $\omega_i$, $0 \leq i \leq n$ such that $\omega_0 \in G$, $\omega_n = \omega$, $\omega_i \in \text{Im}(v_{\omega_{i-1}}^{m|N})$. This could be prove by induction that $\omega_i \in N'$. For $i=0$, $\omega_0 \in G \subseteq N'$. For the induction step, by the definition of $v^{m|N}$, $\text{Im}(v_{\omega_{i-1}}^{m|N}) = \pi(\text{Im}(v_{m[\omega_{i-1}]}))$. By the induction hypothesis and the definition of batch models, $\pi(\text{Im}(v_{m[\omega_{i-1}]})) \subseteq N'$, hence, $\omega_i \in N'$. □

$R^m(G)$ can be computed using a simple queuing algorithm. Starting with $Q=G$, objects $\omega \in Q$ are marked as processed in order, and $\pi(\text{Im}(v_{m[\omega]})) - Q$ is appended to Q. When the entire Q has been processed $R^m(G) = Q$.

Definition 5 Let $S_1, S_2$ be two repositories. $x_1 \in S_1$, $x_2 \in S_2$ will be called equivalent if $\pi_1(r_1) = \pi_2(r_2)$, $D(x_1) = D(x_2)$ and $\pi_1 \circ v_{x_1} = \pi_2 \circ v_{x_2}$. We write $x_1 \simeq x_2$.

Definition 6 A resolution of a batch model is an extension of the form $S \leq S \cup B$, such that:
1. B is a batch.
2. $\pi|B$ is a bijection between B and M.
3. $(m \circ \pi)(x) \simeq x$ for all $x \in B$.
4. $x \in B \cap S \Rightarrow (m \circ \pi)(x) = x$.

$S \leq S \square M$ is a resolution, though not particularly useful. As extensions correspond to editing, it may be useful to minimize B-S (see Proposition 7).

Condition 4) restricts the use of elements of S to models. While dropping it could result in smaller extensions, non-natural choices are required.

Take $Q = \{a, b, x\}$, $\check{D} = \{1\}$, $S = \{a, b, x_1, x_2, x_3\}$ and $\pi$ the obvious choice. Let $D(a) = D(b) = D$, $v_a(1) = x_1, v_b(1) = x_2$, aid $D(x_1) = D(x_2) = D(x_3) = \emptyset$. Define $M = \Omega$ and $m(a) = a$, $m(b) = b$, $m(x) = x_3$. As $R[\{a, b\}]$ is not realistic, a resolution requires at least one new state. Two possibilities are a' with $v_a(1) = x_2$, and b' with $v_b(1) = x_1$, with no natural choice.

With condition 4), $x_1$ and $x_2$ are excluded. The minimal resolution will use both a' and b', with $v_a(1) = v_b(1) = x_3$. This is more intuitive in practice, as the user is aware of the models to be combined, but perhaps not of all states ever created that happen to match.

Proposition 7 For every batch model m, there exist a unique (up to an isomorphism) resolution B(m) such that $B(m) \cap S = \{x \in S | R(x) \subseteq \text{Im}(m)\}$. For any other resolution B, $B \cap S \subseteq B(m) \cap S$, and thus $|B(m) - S|$ is minimal.

Proof: Start with $(M, 1_M, v^m)$, and let $N = \{x \in S | R(x) \subseteq \text{Im}(m)\}$. Glue M and S by identifying x with $\pi(x)$ over N. Let $S' = S ii_N M$, with obvious embeddings $f_S, f_M$. Show that $N \leq S$, $\pi(N) \leq M$, and that $\pi|_N$ is an isomorphism.

For $x \in N$ and $y \in R(x)$, it can be seen that $R(y) \subseteq R(x) \subseteq \text{Im}(m)$, therefore $y \in N$ and $N \leq S$. By the definition of $v^m$, $\text{Im}(v_x^m) = \pi(\text{Im}(v_{m(x)})) = \pi(\text{Im}(v_x)) \subseteq \pi(N)$, as $x \in R(x) \Rightarrow x \in \text{Im}(m) \Rightarrow x = m(\bar{x})$. Thus $\pi(N) \leq M$. Clearly both $pi|_N$ and $m|_{\pi(N)}$ are morphisms, hence $\pi$ is an isomorphism. As M is a hatch, $f_M(M)$ is also a batch.

To show the above construction minimizes $|B - S|$, let B be a resolution. For $x \in B \cap S$, as B is a batch, $R(x) \subseteq B \cap S$. $y \in R(x) \Rightarrow y \in B \cap S \Rightarrow y \in \text{Im}(m)$ by Condition 4) of the resolution definition, hence $R(x) \subseteq N$ and $B \cap S \subseteq N$.

To show that any resolution B with $B \cap S = N$ is isomorphic to $S ii_N M$, apply Proposition 2 for $S \cup B$, with $S_1 = S$, $S_2 = M$, $f_1 = 1_S$, $f_2 = (\pi|_B)^{-1}$. As $\dot{N} \leq \dot{S} \leq (S \cup B)$, $\pi(N) \leq M$ and $\pi|_N$ is an isomorphism, the conditions of Proposition 2 are satisfied. □

Computing $B(m) \cap S$ can be done via the following directed graph algorithm:

Proposition 8 Let (X,E) be a directed graph. and $A \subseteq X$. Let $R(x) = \{y \in X | \exists x = x_0, x_1, \ldots, x_n = y, (x_i, x_{i-1}) \in E, i \geq 0\}$, and L(x) the same construction for the reverted graph. Let $M[A] = \{x \in X | R(x) \subseteq A\}$. Then:
1. $M[M[A]] = M[A]$.
2. M[A] Can be computed by starting with a set $M = \emptyset$, and iterating over the elements of A. For each $x \in A$, if $r_x = \{y \in X | (x, y) \in E\} \subseteq A$, add x to M; otherwise delete L(x) from both A and M. The finishing M will be M[A].

Proof: Clearly $M[M[A]] \subseteq M[A]$. As $y \in R(x) \Rightarrow R(y) \subseteq R(x)$, $R(x) \subseteq A \Rightarrow R(x) \subseteq M[A]$, hence $M[A] \subseteq M[M[A]]$.

An element $x \in M[A]$ can never be deleted, as $r_x \subseteq A$, and $x \in L(y) \Leftrightarrow y \in R(x)$ implies $r_y \subseteq R(x) \subseteq A$. Thus $M[A] \subseteq M$. Conversely if $x \in A - M[A]$, take a minimal length sequence $x = x_0, x_1, \ldots, x_n$ with $(x_{i-1}, x_i) \in E$, $i > 0$, and $x_n \notin A$. Then $x_{n-1} \in A$, $r_{x_{n-1}} \subseteq A$ and $x \in L(x_{n-1})$, and thus x will be deleted. □

To compute $B(m) \cap S$ use $X = DG[S]$ reversed, and $A = \text{Im}(m)$.

8.2 Managing Models

Given the requirements batches satisfy, it is necessary to have a practical way to construct and modify batches. The approach here is to work with sets of desired objects that must appear in the batch, and a sufficient set of models. Based on the two, a resolution batch is constructed using Proposition 7. Operations are provided for changing the set of desired objects and the models, which can be used to implement a user interface.

Given two sets X and Y, denote $M_{X,Y} = \{f: \text{Dom}(f) \subseteq X \to Y\}$, Define $*: M_{X,Y} \times M_{X,Y} \to M_{X,Y}$ by:

$$(f * g)(x) = \begin{cases} f(x), & x \in \text{Dom}(g) \\ g(x), & x \in \text{Dom}(f) - \text{Dom}(g) \end{cases} \quad (1)$$

on $\text{Dom}(f*g) = \text{Dom}(f) \cup \text{Dom}(g)$.

As $\emptyset \subseteq X \times Y$, $\emptyset$ can be thought of as an element of $M_{X,Y}$, and it satisfies $\emptyset * f = f * \emptyset = f$. It is easy to see * is associative, and thus $(M_{X,Y}, *, \emptyset)$ is a non-abelian monoid with unit.

Denote by MS the set of model sets. As a subset of $M\Omega, S$, it is closed under multiplication, and therefore inherits a monoid structure. Define
$G = P(\Omega) \times MS$, and $G^c \subseteq G$ the set of pairs
(G, m) with m G-complete. Let $\Delta$ be the monoid $M_{\Omega, \{1, -1\}} \times MS$. The multiplication $(G, m) * (\delta, q) = (G - \{\delta = -1\} \cup \{\delta = 1\}, m * q)$ is an associative $\Delta$-action on G.

$G^c$ is not $\Delta$-invariant. Model changes affect resources, and generators can be added without sufficient models. However, only $G^c$ may be of interest. Define as set of elementary operations that can be executed via actions that preserve completeness.

Proposition 9 For $(G, m) \in G^c$, we define the following operators:
- $\oplus^1$: For $x \in S$, define $\text{Dom}(\delta) = \{\bar{x}\}$, $\delta(\bar{x}) = 1$, $q = (\pi|^{R(x)})^{-1}$. $(G, m) \oplus^1 x = (G, m) * (\delta, q)$.
- $\oplus$: For $x \in S$, let $N_m(x) = \{y \in S | \exists x = y_0, y_1, \ldots, y_n = y, \bar{y}_i \notin M, y_i \in \text{Im}(v_{y_{i-1}}) \forall i > 0\}$, and define $\delta$ as for $\oplus^1$. $q = (=|_{N_m(x)})^{-1}$, and $(G, m) \oplus x = (G, m) * (\delta, q)$.
- $\ominus$: For $\omega \in \Omega$, define $\text{Dom}(\delta) = \{\omega\}$, $\delta(\omega) = -1$, $q = \emptyset$, $(G, m) \ominus \omega = (G, m) * (\delta, q)$.

Then $(G,m)\oplus^1 x$, $(G,m)\oplus x$, $(G,m)\ominus\omega\in G^c$.

Proof:

$\oplus^1$ The replaced model comes with a full set of resources. If a chain uses new resources, it has been changed and hence R(x) provides them.

$\oplus$ No old model is replaced, so the only potential problem is $\bar{x}$. In that case all resources are part of $\pi(N_m(x))$, until M until M is reached.

$\ominus$ Obvious as G decreases.

The $\Delta$ action never decreases M. An implementation can reduce M to $R^m[G]$ each operation, discarding redundant models immediately. This also simplifies computations (see Proposition 16 2 and Step 5 at the end of Section 9.2).

For $\bar{x} \notin M$, $(G, m)\oplus r\ominus \bar{x}=(G, m)$, but $(G, m)\oplus^1 x\ominus \bar{x}=(G, m)$ can be false, hence the "!". If $\bar{x}\in M$, neither put is reversible, as the old model for $\bar{x}$ will be lost.

The elementary operations can be used to provide the functionality a user might expect:

1. Make object generator: For $\omega\in M$, do $(G,m)\oplus m(\omega)$.
2. Remove generator: $\ominus$. This is the closest to a "delete object" operation, which is not possible, as user states impose constraints. The object will be removed only if it is not in use.
3. Add or replace model: $\oplus$ or $\oplus^1$, as needed. These will be called put operations. The two operations can be combined to reconcile conflicting models.
4. Editing a model: Editing requires extending $S<S'=S\cap\{x'\}$. The new state x' should be limited to $Im(v_{x'})\subseteq B(m_G)$, in which case $\oplus x'$ can be performed with $N_m(x')=\emptyset$. In practice, when adding a resource to a state it is not convenient to have to choose which put operation to use. Restricting editing resources to $B(m_G)$ separates editing from the more complex task of using puts.

9. An Incremental Algorithm for Computing Minimal Resolutions

To compute B(m), $R^m(G)$ and $S\cap B(m)$ must be computed. While Section 8.1 provides a direct algorithm, they may be computationally expensive. In Section 9.2, both problems can be rephrased in terms of numerical equations. In the acyclic case, the equations have unique solutions, computable by an incremental algorithm.

Section 9.1 below describes an algorithm applicable to a certain class of equations, used in Section 9.2 to recast computing B(m) in numerical terms. It can then be shown that B(m) can be updated after a $\Delta$-action, by applying the methods of Section 9.1 to two related equations.

9.1 Signals Over a Acyclic Network

Let X be a finite set and $\epsilon\colon X\times\mathbb{R}\to\mathbb{R}$. For every $r\colon X\times X\to\mathbb{R}$, define an operator $K_r\colon \mathbb{R}^X\to\mathbb{R}^X$ by $(K_r f)(x)=\Sigma_{y\in X} r(x,y)\epsilon(y, f(y))$. Clearly $K_{\alpha r+\beta s}=\alpha K_r+\beta K_s$, though $K_r$ itself is not linear if $\epsilon$ is not.

Proposition 10 With the notations above, if the graph $(X,supp(r))$ is acyclic, the equation $(I-K_r)f=a$, $a\colon X\to\mathbb{R}$ has a unique solution. r will be called acyclic, and we denote $(I-Kr)^{-1}=T_r$.

Proof: For $x\in X$, define $|x|_r$ to be the maximum length of a chain $x=x_0, x_1, \ldots, x_n$ such that $r(x_i,x_{i+1})\neq 0$, $0\leq i<n$. This is well defined, as for r acyclic there are no infinite chains. The equation can be rewritten $f=a+K_r f$, which constitutes a recursive formula describing $f(x)$ in terms of $f(y)$ with $|y|_r<|x|_r$. Existence and uniqueness follow by induction on $|\cdot|_r$. $\square$ This section provides a way to update $T_r f$ with small changes in r and $f$ once $T_r f$ has already been computed. This is purely an efficiency exercise, as the result can always be computed with a full iteration.

Let $f$, $\delta\colon X\to\mathbb{R}$ (think of $\delta$ as changes that need to be propagated onto a), and $x\in X$. Define $f_x=f+\chi_{(x)}\delta$ and:

$$\delta_x(y) = \begin{cases} 0, & y = x \\ \delta(y) + r(y, x)[\epsilon(x, f(x) + \delta(x)) - \epsilon(x, f(x))], & y \neq x \end{cases} \quad (2)$$

Denote $(f_x, \delta_x)$ by $(f, \delta)*x$. For a sequence $s=(x_1, x_2, \ldots)$ in X denote $(f, \delta)_{s,n}=(f, \delta)*x_1*x_2* \ldots *x_n$.

Proposition 11 The following hold:
1. Any sequence $\{(f, \delta)_{a,n}\}_n$ stabilizes to a pair $(f_s, \delta_s)$.
2. There exists a sequence s such that $\delta_s=0$.
3. If s, s' are sequences such that $\delta_s=\delta_{s'}=0$, then $f_s=f_{s'}$. The unique limit $f\leftarrow_r \delta=f_s$ satisfies $(I-K_r)(f\leftarrow_r \delta)=\delta+(I-K_r)f$.

Proof:
1. For any g,d: $X\to\mathbb{R}$ define $\|(g,d)\|=\{|\{x\in X|d(x)\neq 0, |x|_r=n\}|\}_{n\in N}$ ordered lexicographically. The length of words is at most $\max_{x\in X}|x|_r$, therefore there are no infinite strictly decreasing sequences in this order. $\|(g,d)*x\|\leq\|(g,d)\|$ gives the conclusion.
2. $\|(g,d)*x\|=\|(g,d)\|$ only if d(x)=0, therefore the norm can be strictly decreased if $d\neq 0$. With no infinite strictly decreasing sequences 0 must be reached.
3. We will first show by induction on n that $\delta_n+(I-K_r)f_n=\delta+(I-K_r)f$. This is obvious for n=0. For the induction step, at $x_n$ we get $\delta_n(x_n)=0$, $f_n(x_n)=f_{n-1}(x_n)+\delta_{n-1}(x_n)$ and $K_r f_n=K_r f_{n-1}$ as $f_n(y)=f_{n-1}(y)$, $y\neq x$. Therefore the left side of the equation does not change. For $y\neq x_n$, $f_n(y)=f_{n-1}(y)$ and $\delta_n(y)-\delta_{n-1}(y)=r(y,x_n)[\epsilon(x, f_{n-1}(x)+\delta_{n-1}(x))-\epsilon(x, f_{n-1}(x))]=[K_r f_n](y)-[K_r f_{n-1}](y)$, as the sum entries in $[K_r f_n](y)$ and $[K_r f_{n-1}](y)$ are equal except for $x_n$, proving the formula. For n large enough, $\delta_n=0$ and $f_n=f_s$, and (3) follows due to the uniqueness of Proposition 10.

Applying $T_r$ to the equation in (3) with $f=T_r a$ we get $T_r a\leftarrow_r \delta=T_r(\delta+(I-K_r)f)=T_r(\delta+a)$ which is the desired computation. Also, $(f\leftarrow_r \delta)\leftarrow_r \delta'=T((I-K_r)f+\delta+\delta')=f\leftarrow_r(\delta+\delta')$, allowing to consolidate changes for one application of the algorithm. Additionally, as applications of x's to $(f, \delta)$ commute, a simple queuing algorithm works.

Implementations may also would want to know how to change

Proposition 12 Let r and s be acyclic. Then:
1. $T_s a=T_r a\leftarrow_s K_{s-r}T_r a$.
2. $T_s b=T_r a\leftarrow_s (b-a+K_{s-r}T_r a)$.
3. With the $r_A(x,y)=\chi_A(x)r(x,y)$, $A\subseteq X$, we have $T_{r_B}\chi_B a=T_{r_A}\chi_A a\leftarrow_{r_B}(\chi_B-\chi_A)(a+K_r T_{r_A} a)$.

Proof: These are straight-forward verifications.
1. $(I-K_s)(T_r a\leftarrow_s K_{s-r}T_r a)=(I-K_s)T_r a+K_{s-r}T_r a=T_r a-K_s T_r a+K_s T_r a-K_r T_r a=(I-K_r)T_r a=a$.
2. $T_s b=T_s a\leftarrow_s (b-a)=[T_r a\leftarrow_s K_{s-r}T_r a]\leftarrow_s (b-a)=T_r a\leftarrow_s (b-a+K_{s-r}T_r a)$.
3. Apply (2) with $a=\chi_A a$, $b=\chi_B a$, $r=r_A$, $s=r_B$.

One has to be careful with cycles. The sequence $(f, \delta)*x_1*x_2*\ldots$ makes sense even when r is cyclic, as equation (2) is always defined. It is possible however that it does not stabilize. This could occur in the context of Proposition 12, if r is acyclic, but s is not.

An example is $X=\{w, x, y, z\}$, $\epsilon=sgn$, $r(y,x)=r(x,w)=1$ and 0 otherwise, $s(y,x)=s(z,y)=s(x,z)=1$ and 0 otherwise, and $a(w)=1$, $a(x)=a(y)=a(z)=0$. $T_r a=(1,1,1,0)$ and $K_{s-r}T_r a=(0, -1,0,1)$. The sequence $(T_r a, K_{s-r}T_r a)*x*z*y*x*z*y*\ldots$ will cycle with period 6. Notice that $(T_r a, K_{s-r}T_r a)*x*y$ finishes with $(1,0,0,0)$, while $(T_r a, K_{s-r}T_r a)*z$ finishes with $(1,1,1,1)$; both are solutions to the equation $(I-K_s)f=a$.

The algorithm can be adapted so that it terminates with an error in such a case, by keeping track of information about changed vertices. When computing a sequence $(f, \delta)^* x_1^* x_2^* \ldots$ associate a set $C(x)$ to every $x \in X$, initially $\emptyset$. Whenever Equation 2 is used with $y \neq x$, replace $C(y)$ with $C(y) \cup C(r) \cup \{x\}$ and check whether $y \in C(y)$. If so, the algorithm exits, and $r$ is known to be cyclic.

The algorithm may finish normally, even with cycles present, thus is not a substitute for checking for cycles. In practical cases where cycles are unlikely, having an option to turn checks off helps avoiding unnecessary computations.

9.2 the $\mu_G^m$ and $\rho^m$ Equations

Turning to computing $R^m[g]$ and $B(m)$, one can derive numerical characterizations for $R^m(G)$ and $B(m)$, valid whether the graphs are acyclic or not. Using the methods of Section 9.1, one can show Equations (3) and (5) have unique solutions when both $DG[v]$ and $DG[v^m]$ are acyclic. Finally, an algorithm for recomputing B for the result of a $\Delta$-action $(G', m')=(G, m)*(\delta, q)$ (Section 2.2), from $R^m[G]$ and $B(m_G)$ is disclosed.

Proposition 13 Let m be a G-complete model set, and define $\mu_G^m$: $\Omega \to Z$, $\mu_G^m(\omega) = \chi_G(\omega) + \Sigma_{\omega' \in R^m(G)} |v^{mG}|(\omega, \omega')$. Then $\omega \in R^m(G) \Leftrightarrow \mu_G^m(\omega) > 0$ and:

$$\mu_G^m(\omega) = \chi_G(\omega) + \sum_{\omega' \in \Omega} |v^{mG}|(\omega, \omega') \cdot \text{sgn}(\mu_G^m(\omega')) \quad (3)$$

Proof: $\omega \in R^m[G]$ if and only if either $\omega \in G$, or $\omega \in \text{Im}(v_{\omega'}^{mG})$ for some $\omega' \in R^m[G]$. As $x \in \text{Im}(v_y) \Leftrightarrow |v(x,y)| > 0$, the equivalence is clear. $\chi_{R^m[g]} = \text{sgn} \circ \mu_G^m$ simply rephrases $\omega \in R^m(G) \Leftrightarrow \mu_G^m(\omega) > 0$, hence the equality. □

For $r \in S$ define:

$$\gamma(x, k) = \begin{cases} 0, & k \le |D(x)| \\ 1, & k > |D(x)| \end{cases} \quad (4)$$

Proposition 14 Let m be a batch model, and define $\rho^m$: $S \to Z$ by $\rho^m(x) = \chi_{\text{Im}(m)}(x)(1 + \Sigma_{y \in S}|v|(y,x)\chi_{B(m) \cap S}(y))$. Then $x \in B(m) \cap S \Leftrightarrow \rho^m(x) = 1 + |D(x)|$ and $$\rho^m(x) = \chi_{\text{Im}(m)}(x)\left(1 + \sum_{y \in S} |v|(y, x)\gamma(x, \rho^m(y))\right) \quad (5)$$

Proof: Since $\Sigma_{y \in S}|v|(y,x)\chi_{B(m) \cap S}(y) = |\{d \in D(x)| v_x(d) \in B(m) \cap S\}|$, $\rho^m(x) \le 1 + |D(x)|$. If the equality holds, $x \in \text{Im}(m)$ and $\text{Im}(v_x) \subseteq B(m) \cap S$, hence $R(x) \subseteq B(m) \cap S \subseteq \text{Im}(m)$ and $x \in B(m) \cap S$, by Proposition 7. Conversely, since $B(m) \cap S$ is a batch, $x \in B(m) \cap S \Rightarrow R(x) \subseteq B(m)$ S. For $y \in \text{Im}(v_x) \subseteq R(x) \subseteq B(m) \cap S$ we have $\chi_{B(m) \cap S}(y) = 1$, and thus $\rho^m(x) = 1 + |D(x)|$.

Now $\gamma(x, \rho^m(y)) = 1 \Leftrightarrow y \in B(m) \Omega S \Leftrightarrow \chi_{B(m) \cap S}(y) = 1$ gives (5). □

For the acyclic case, Let $(G', m')=(G, m)*(\delta, q)$, and denote $M_- = M \cap \text{Dom}(q)$, the objects whose models will be replaced.

Proposition 15 If $DG[v^m]$ acyclic, then:

1. Equation (3) has a unique solution $\mu$.
2. Denote by $\mu$ the solution for $(G, m)$, by $\mu'$ the solution for $(G', m')$, and define $\delta_\mu$: $\Omega \to Z$ by:

$$\delta_\mu(\omega) = \quad (6)$$
$$\delta(\omega) + \sum_{\xi \in \text{Dom}(q)} |v^{m'}|(\omega, \xi) \cdot \text{sgn}(\mu(\xi)) - \sum_{\xi \in M_-} |v^m|(\omega, \xi) \cdot \text{sgn}(\mu(\xi))$$

Then $\mu'$ is the result of propagating $\delta_\mu$ onto $\mu$, using $|v^{m'}|$ for edge weights and $\epsilon$: $\Omega \times Z \to Z$, $\epsilon(\omega, k) = \text{sgn}(k)$.

Proof: With the notations of Section 9.1 and $X = \Omega$, $\epsilon = \text{sgn}$, $r = |v^{m'}|$ Equation (3) becomes $\mu = \chi_G + K_r\mu$. $DG[v^m]$ is the same as the graph of Proposition 10. As DGrvms is acyclic, the solution to Equation (3) is unique, and $\mu = T_{r_A}\chi_G$.

Proposition 12 2) with $a = \chi_G$, $s = |v^{m'}|$, $b = \chi_{G'}$ gives $\delta_\mu = \delta + (K_s - K_r)\mu$. The conclusion follows by computing $(K_s - K_r)\mu = K_{s-r}\mu$ (by linearity of K):

$$(s - r)(\omega, \theta) = \quad (7)$$
$$(|v^{m'}| - |v^m|)(\omega, \theta) = \sum_{\xi \in \text{Dom}(q)} \delta_{\theta,\xi}|v^{m'}|(\omega, \xi) - \sum_{\xi \in M_-} \delta_{\theta,\xi}|v^m|(\omega, \xi)$$

where $\delta_{-,-}$ is the Kronecker delta, and $\omega, \theta \in \Omega$. This gives:

$$[(K_s - K_r)\mu](\omega) = \sum_{\theta \in \Omega} \sum_{\xi \in \text{Dom}(q)} \delta_{\theta,\xi}|v^{m'}|(\omega, \xi)\epsilon(\mu(\theta)) - \quad (8)$$
$$- \sum_{\theta \in \Omega} \sum_{\xi \in M_-} \delta_{\theta,\xi}|v^m|(\omega, \xi)\epsilon(\mu(\theta)) =$$
$$= \sum_{\xi \in \text{Dom}(q)} |v^{m'}|(\omega, \xi)\epsilon(\mu(\xi)) -$$
$$\sum_{\xi \in M_-} |v^m|(\omega, \xi)\epsilon(\mu(\xi))$$

□

In practice, Equation (6) needs to be computed only $\omega$ a vm-resource of objects in Dompqq, as it 0 otherwise.

Turning to p:

Proposition 16 With $DG[v]$ and $DG[v^m]$ acyclic, let $X = S$, $A = \{m(\omega)|\omega \in M, \mu(\omega) > 0\} \subseteq S$, $r(x, y) = |v|(y,x)$, $\forall x, y \in S$ and $\epsilon = \gamma$ (Equation (4)):

1. Using $m_G$ as Proposition 14's m, Equation (5) has a unique solution $\rho = T_{r_A}\chi_A$.
2. Assume in $m = m_G$. With $\mu$, $\mu'$ as above, let $B = m(M_-) \cup \{m(\omega)|\omega \in M, \mu'(\omega) = 0\}$, $C = \{q(\omega)|\omega \in \text{Dom}(q), \mu'(\omega) > 0\}$, and define:

$$\delta_\rho = (\chi_C - \chi_B)(1 + K_r\rho) \quad (9)$$

Then $\rho'$ is the result of propagating $\delta_\rho$ onto using $X = S$, and $r_A$, for edge weights.

3. Define $\sigma_\rho$: $S \to \{-1, 0, 1\}$ by:

$$\sigma_\rho = \chi_{[\rho'[x]>0, \gamma(x, \rho'[x])=0]} - \chi_{[\rho(x)>0, \gamma(x, \rho(x))=0]} \quad (10)$$

Then x needs a new equivalent state constructed if and only if $\sigma_\rho(x) = 1$, and has an obsolete equivalent state if and only in $\sigma_\rho(x) = -1$. $\sigma_\rho$ is called the $\rho$-signal of $(\delta, q)$.

Proof: By Proposition 15, $\text{Im}(m_G) = \{m(\omega)|\omega \in M, \mu(\omega) > 0\}$. Proposition 12 3) gives 1) using $X := S$, $\epsilon := \gamma$, $r(x,y) := |v|(y,x)$, $A := \text{Im}(m_G)$, $B := \text{Im}(m'_{G'})$. To show the formula given there is equivalent to Equation (9) we need to show $\chi_{A'} - \chi_A = \chi_C - \chi_B$.

As $B \subseteq \text{Im}(m)$ and $m = m_G$, $B \subseteq A$. $A - A' \subseteq B$ as a disappeared model $m(\omega)$ must have either $\omega \in M_-$ (i.e. replaced), or $\mu'(\omega) = 0$ (i.e. obsolete). $\text{Dom}(m') = M \cup \text{Dom}(q)$, hence $A' \subseteq \text{Im}(m) \cup \text{Im}(q) = A \cup \text{Im}(q)$, as $m = m_G$ implies $A = \text{Im}(m)$. Therefore $A' - A \subseteq \text{Im}(q)$, and as $\mu' \circ \pi > 0$ on $A'$, $A' - A \subseteq C$. By Proposition 15, $C \subseteq A'$.

We have obtained $A-A'\subseteq B\subseteq A$ and $A'-A\subseteq C\subseteq A'$; also, $B\cap A'=C\cap A=\{m(\omega)|\omega\in M_-, \mu'(\omega)>0\}$, $\chi_{A'}-\chi_A=\chi_C-\chi_B$ can be checked by looking at $A-A'$, $A'-A$ and $A\cap A'$.

For 3), $x\in S$ needs an equivalent state if $x\in Im(m_G)$ and $\gamma(x, \rho(x))=0$. By Equation (5), $\rho(x)=0 \Leftrightarrow x\notin Im(m_G)$. Thus x needs an equivalent state if and only if $\rho(x)>0$ and $\gamma(x,\rho(x))=0$. $\sigma_\rho$ simply takes the difference. □

Propositions 15 and 16 can be combined into the following steps to update $B(m_G)$ for the action of $(\delta,q)$ Propositions 15 and 16 can be combined into the following steps to update $B(m_G)$ for the action of $(\delta,q)$.

1. Compute the µ-signal $\sigma_\mu=\mu'-\mu$.
   (a) Compute $\delta\mu$ by iterating over Dom(q).
   (b) Propagate $\delta\mu$ onto µ, computing the µ-signal for all touched vertices.
   (c) Retain the set $M_{obs}\{\omega\in M|\mu'(\omega)=0\}$ of old models that have become obsolete. This will be needed in Step 2a.
2. Compute the ρ-signal $\sigma_\rho$:
   (a) Compute $\delta_\rho$. As $M_-\subseteq Dom(q)$, B and C can be obtaining by iterating over Dom(q) and $M_{obs}$ (Step 1c). $K_r\rho$ needs to be computed only on $B\cup C$.
   (b) Propagate $\delta_\rho$ onto ρ, computing the ρ-signal of all touched vertices.
3. For each x with ρ-signal+1, a new state must be created in $B(m'_{G'})-S$, while for ρ-signal −1, the unique $y\in B(m_G)-S$, $y\simeq x$ should be discarded.
4. Make appropriate equivalence-preserving changes to states outside S, so that all resources are in $B(m'_{G'})$
5. Discard redundant models, i.e. $\omega\in M'$ with $\rho'(\omega)=0$. This insures the $m=m_G$ requirement of Proposition 16 2) is satisfied for the next iteration.

The steps can be done manually on the example of FIGS. 2A and 2B.

Figure 4:
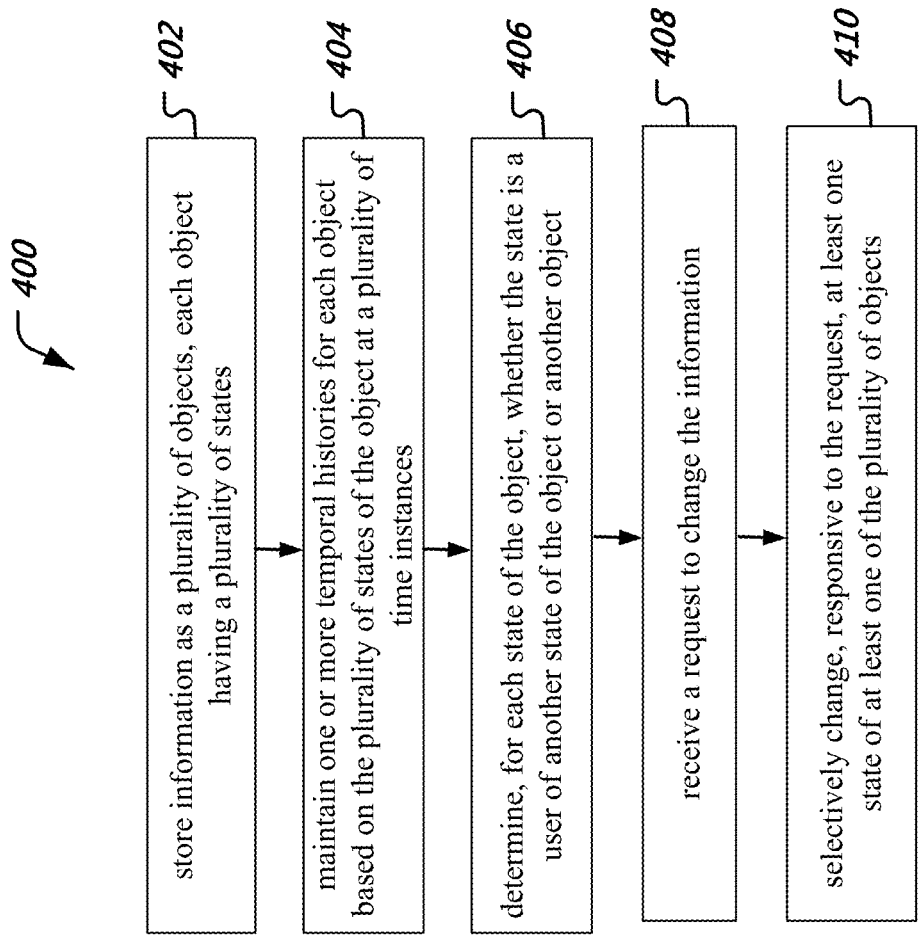
FIG. 4 is a flowchart representation of an example process of managing changes to information.

FIG. 4 is a flowchart representation of a process 400 for managing changes to information. The process may be implemented at the client device 2902 or the server 2906

At 402, information is stored as a plurality of objects. Each object can have a plurality of states. For example, the object may be, e.g., a software code, a stock value, a sports event score, a candidate's vote tally in an election, etc.

At 404, one or more temporal histories for each object is maintained based on the plurality of states of the object at a plurality of time instances. In some implementations, the time instances at which the state of the object is tracked may be periodic (e.g., once every second or once every day). In some implementations, the time instances may be triggered based on the relative periodicity with which changes occur to the state. For example, a user or an external system may provide a rule for tracking changes to the object.

In some implementations, state changes to the object may be based on at least one a priory function for changing the state of the object. In some cases, the state may not be changeable using the a priori function. In this case, a new temporal history may be started for the object. For example, to track the price of a stock, a function may specify daily closing price of the stock to be tracked as a state of the stock price object. However, the stock may split, or may be changed from a preferred stock to another type of stock. This change may be captured by starting a new temporal history for the stock. As another non-limiting example, in a software code development effort, normal changes to code files may be tracked as changes to a given temporal history, based on the a priori function that specifies normal code changes. However, occasionally, changes may be tracked as a different temporal history (e.g., when the code author changes, or when the source file starts or stops supporting certain operating system feature etc.).

At 406, at least one state of an object is selectively changed in response to the request. Some states may be in a frozen state, e.g., are not permitted to be changed by requests. For example, a request attempting to change the 1950 World Series champion may be rejected. However, Sections 1 to 6 disclose a trimming method by which frozen states can be changed. One useful example would be to fix a mistake to the 1950 World Series champion in a database.

Figure 5:
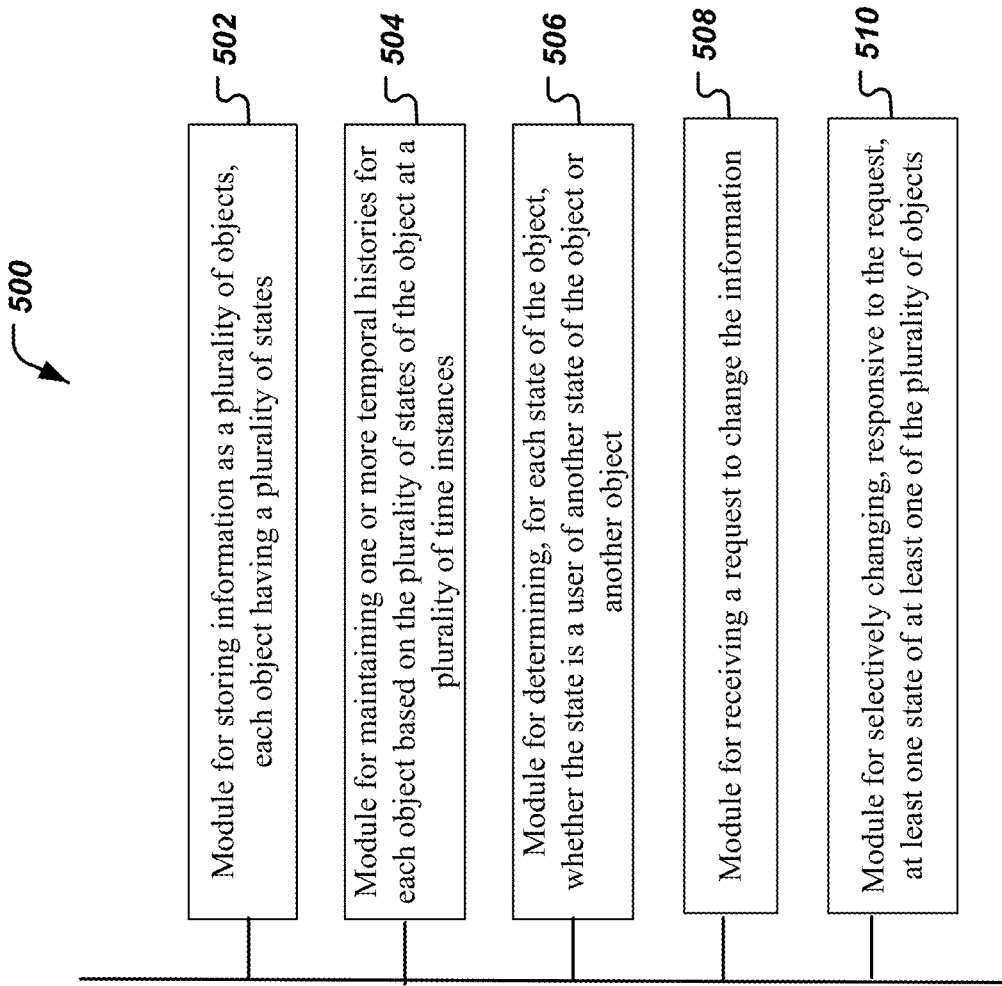
FIG. 5 is a block diagram representation of an example of an apparatus for managing changes to information.

FIG. 5 is a block diagram representation of an apparatus 500 for managing changes to information. The module 502 is for storing information as a plurality of objects, each object having a plurality of states. The module 504 is for maintaining one or more temporal histories for each object based on the plurality of states of the object at a plurality of time instances. The module 506 is for determining, for each state of the object, whether the state is a user of another state of the object or another object. The module 508 is for receiving a request to change the information. The module 510 is for selectively changing, responsive to the request, at least one state of at least one of the plurality of objects. The apparatus 500 and modules 502, 504, 506, 508, 510 can be further configured to implement some of the techniques disclosed in the present document.

It will be appreciated that techniques are provided for managing changes to information. The disclosed techniques maintain one or more temporal histories for data objects. States of data objects may be interdependent upon each other.

It will further be appreciated that the interdependencies in the states of data objects are represented as relationships between "resource" states and "user" state. An acyclic relationship is enforced between user states and resource states to facilitate maintaining temporal histories of data objects.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of managing changes to hierarchical data, comprising:
    receiving a first request to change information comprising the hierarchical data, wherein the information is stored as a description of a batch comprising a first plurality of states;
    identifying a plurality of models corresponding to (a) a subset of states of the first plurality of states and (b) a second plurality of states affected by the first request;
    determining, responsive to the first request, a third plurality of states comprising the subset of states and the second plurality of states;
    identifying equivalent states for each of a subset of the plurality of models; and
    updating, based on the equivalent states and the description, the batch to include the third plurality of states, wherein each state of the first plurality of states and the third plurality of states is designated as a generator or a resource of a generator,
    wherein determining the third plurality of states comprises excluding a given resource upon a determination that a corresponding generator, which is the only generator that uses the given resource, is removed from the description of the batch responsive to the first request,
    wherein the equivalent states identify a first state and a second state, and wherein at least one resource of the first state is different from at least one resource of the second state.

2. The method of claim 1, wherein each model of the subset of the plurality of model comprises a resource that is not part of the subset of states and the second plurality of states.

3. The method of claim 1, further comprising:
    representing the third plurality of states as a directed graph having a vertex corresponding to a state and edges corresponding to resources of the plurality of models; and
    validating, subsequent to the updating, the batch based on a determination about whether the directed graph is acyclic.

4. The method of claim 1, further comprising:
    validating a state in the first plurality of states, the second plurality of states or the third plurality of states based on information of the state and resources of the state; and
    outputting, based on the validating, a Boolean value indicative of a validity of the state.

5. The method of claim 1, further comprising:
    receiving a second request to undo the change; and
    updating, responsive to the second request, the batch by reverting to the first plurality of states.

6. The method of claim 5, wherein a first resource of a given state was replaced by a second resource based on the first request, and wherein the method further comprises:
    replacing, responsive to the second request, the second resource by the first resource based on the equivalent states identified for the subset of models.

7. The method of claim 1, wherein identifying equivalent states comprises making copies of each of the subset of the plurality of models.

8. The method of claim 1, wherein the plurality of models comprises at least two models that are not compatible with each other.

9. The method of claim 1, wherein the first and second states are generators.

10. An apparatus comprising a processor and a non-transitory memory with instructions thereon, wherein the instructions upon execution by the processor, cause the processor to implement a method of managing changes to hierarchical data, the method comprising:
  receiving a first request to change information comprising the hierarchical data, wherein the information is stored as a description of a batch comprising a first plurality of states;
  identifying a plurality of models corresponding to (a) a subset of states of the first plurality of states and (b) a second plurality of states affected by the first request;
  determining, responsive to the first request, a third plurality of states comprising the subset of states and the second plurality of states;
  identifying equivalent states for each of a subset of the plurality of models; and
  updating, based on the equivalent states and the description, the batch to include the third plurality of states, wherein each state of the first plurality of states and the third plurality of states is designated as a generator or a resource of a generator,
  wherein determining the third plurality of states comprises excluding a given resource upon a determination that a corresponding generator, which is the only generator that uses the given resource, is removed from the description of the batch responsive to the first request,
  wherein the equivalent states identify a first state and a second state, and wherein at least one resource of the first state is different from at least one resource of the second state.

11. The apparatus of claim 10, wherein each model of the subset of the plurality of model comprises a resource that is not part of the subset of states and the second plurality of states.

12. The apparatus of claim 10, wherein the method further comprises:
  representing the third plurality of states as a directed graph having a vertex corresponding to a state and edges corresponding to resources of the plurality of models; and
  validating, subsequent to the updating, the batch based on a determination about whether the directed graph is acyclic.

13. The apparatus of claim 10, wherein the method further comprises:
  validating a state in the first plurality of states, the second plurality of states or the third plurality of states based on information of the state and resources of the state; and
  outputting, based on the validating, a Boolean value indicative of a validity of the state.

14. The apparatus of claim 10, wherein the method further comprises:
  receiving a second request to undo the change; and
  updating, responsive to the second request, the batch by reverting to the first plurality of states.

15. The apparatus of claim 14, wherein a first resource of a given state was replaced by a second resource based on the first request, and wherein the method further comprises:
  replacing, responsive to the second request, the second resource by the first resource based on the equivalent states identified for the subset of models.

16. A non-transitory computer readable storage medium having instructions stored thereupon, the instructions, when executed by a processor, causing the processor to implement a method of managing changes to hierarchical data, comprising:
  instructions for receiving a first request to change information comprising the hierarchical data, wherein the information is stored as a description of a batch comprising a first plurality of states;
  instructions for identifying a plurality of models corresponding to (a) a subset of states of the first plurality of states and (b) a second plurality of states affected by the first request;
  instructions for determining, responsive to the first request, a third plurality of states comprising the subset of states and the second plurality of states;
  instructions for identifying equivalent states for each of a subset of the plurality of models; and
  instructions for updating, based on the equivalent states and the description, the batch to include the third plurality of states, wherein each state of the first plurality of states and the third plurality of states is designated as a generator or a resource of a generator,
  wherein the determining the third plurality of states comprises excluding a given resource upon a determination that a corresponding generator, which is the only generator that uses the given resource, is removed from the description of the batch responsive to the first request,
  wherein the equivalent states identify a first state and a second state, and wherein at least one resource of the first state is different from at least one resource of the second state.

17. The non-transitory computer readable storage medium of claim 16, wherein each model of the subset of the plurality of model comprises a resource that is not part of the subset of states and the second plurality of states.

18. The non-transitory computer readable storage medium of claim 16, wherein identifying equivalent states comprises making copies of each of the subset of the plurality of models.

* * * * *